(12) United States Patent
Mueller et al.

(10) Patent No.: US 7,081,064 B2
(45) Date of Patent: Jul. 25, 2006

(54) TWO-SPEED TRANSFER CASE WITH ADAPTIVE CLUTCH CONTROL

(75) Inventors: Joseph G. Mueller, Balston Spa, NY (US); Gareth Thomas, Banbury Oxfordshire (GB)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

(21) Appl. No.: 11/074,364

(22) Filed: Mar. 7, 2005

(65) Prior Publication Data

US 2005/0145063 A1   Jul. 7, 2005

Related U.S. Application Data

(63) Continuation of application No. 10/696,944, filed on Oct. 30, 2003, now Pat. No. 6,905,436.

(51) Int. Cl.
*F16H 37/06* (2006.01)

(52) U.S. Cl. .................................. 475/204; 475/320

(58) Field of Classification Search .............. 475/198, 475/204, 317, 320; 192/84.6
See application file for complete search history.

(56) References Cited

U.S. PATENT DOCUMENTS

| | | | |
|---|---|---|---|
| 4,805,486 A | 2/1989 | Hagiwara et al. | 475/150 |
| 4,895,236 A | 1/1990 | Sakakibara et al. | 192/84.6 |
| 4,950,214 A | 8/1990 | Botterill | 475/231 |
| 5,007,886 A | 4/1991 | Holmquist et al. | 475/231 |
| 5,080,640 A | 1/1992 | Botterill | 475/231 |
| 5,323,871 A | 6/1994 | Wilson et al. | 180/197 |
| 5,352,164 A | 10/1994 | Bensinger et al. | 475/223 |
| 5,407,024 A | 4/1995 | Watson et al. | 180/248 |
| 5,423,235 A | 6/1995 | Botterill et al. | 74/665 GA |
| 5,520,590 A | 5/1996 | Showalter et al. | 475/295 |
| 5,655,986 A * | 8/1997 | Wilson et al. | 475/204 |
| 5,697,861 A * | 12/1997 | Wilson | 475/198 |
| 6,173,624 B1 | 1/2001 | Decker | 74/473.37 |
| 6,203,465 B1 | 3/2001 | Showalter | 475/204 |
| 6,230,577 B1 | 5/2001 | Showalter et al. | 74/337.5 |
| 6,283,887 B1 * | 9/2001 | Brown et al. | 475/204 |
| 6,296,590 B1 | 10/2001 | Gassmann | 475/231 |
| 6,367,344 B1 | 4/2002 | Vogt et al. | 74/335 |
| 6,398,686 B1 | 6/2002 | Irwin | 475/150 |
| 6,405,822 B1 | 6/2002 | Lee | 180/251 |

(Continued)

FOREIGN PATENT DOCUMENTS

DE    3908478 A1    10/1989

(Continued)

*Primary Examiner*—Sherry Estremsky
(74) *Attorney, Agent, or Firm*—Harness, Dickey & Pierce P.L.C.

(57) ABSTRACT

A transfer case having an input shaft driven by a powertrain, a first output shaft adapted for connection to a first driveline, a second output shaft adapted for connection to a second driveline, an interaxle differential operably disposed between the input shaft and the first and second output shafts, and a torque transfer mechanism. The torque transfer mechanism includes a friction clutch assembly operably disposed between the first output shaft and the second output shaft, and a clutch actuator assembly for generating and applying a clutch engagement force to the friction clutch assembly. The clutch actuator assembly includes an electric motor, a geared reduction unit, and a clutch apply operator. A control system including vehicle sensors and a controller are provided to control actuation of the electric motor.

21 Claims, 16 Drawing Sheets

U.S. PATENT DOCUMENTS

| | | | |
|---|---|---|---|
| 6,484,857 B1 | 11/2002 | Vonnegut et al. | 192/35 |
| 6,503,167 B1 | 1/2003 | Sturm | 475/231 |
| 6,568,519 B1 | 5/2003 | Lovatt | 192/56.6 |
| 6,783,475 B1 | 8/2004 | Gazyakan et al. | 475/210 |
| 6,802,794 B1 | 10/2004 | Showalter | 475/269 |
| 6,808,037 B1 | 10/2004 | Mueller | 180/247 |
| 6,827,663 B1 | 12/2004 | Tucker-Peake | 475/231 |
| 2002/0142877 A1* | 10/2002 | Williams et al. | 475/198 |
| 2003/0192401 A1 | 10/2003 | Thomas et al. | 74/665 GA |

FOREIGN PATENT DOCUMENTS

| | | |
|---|---|---|
| JP | 2-18117 | 1/1990 |
| JP | 3-66927 | 3/1999 |

\* cited by examiner

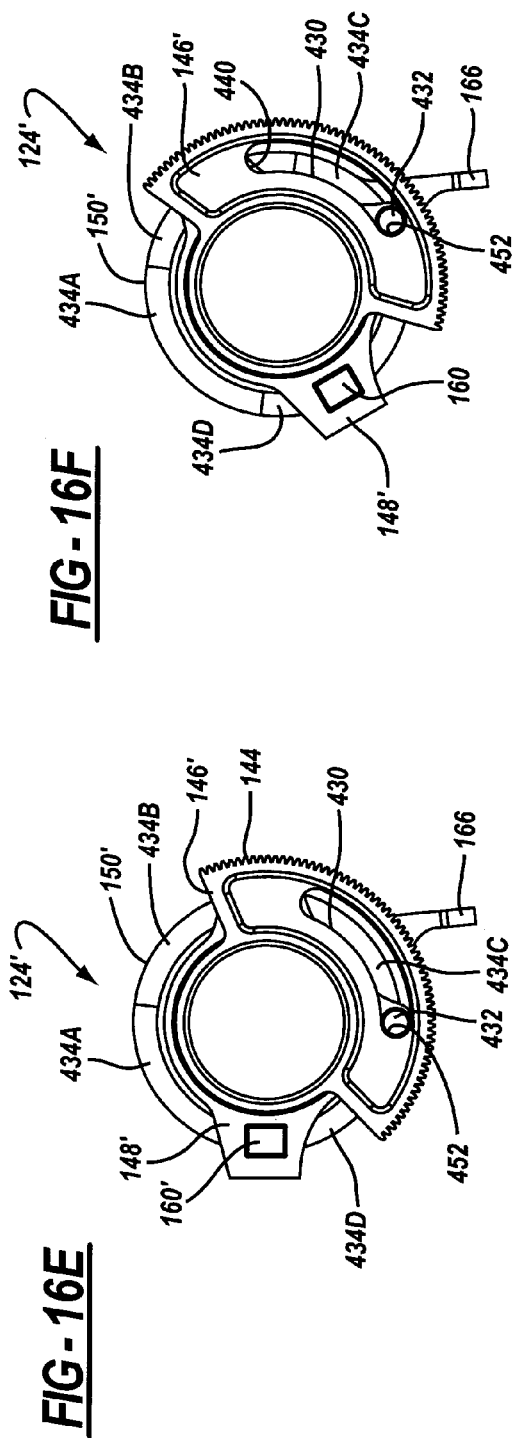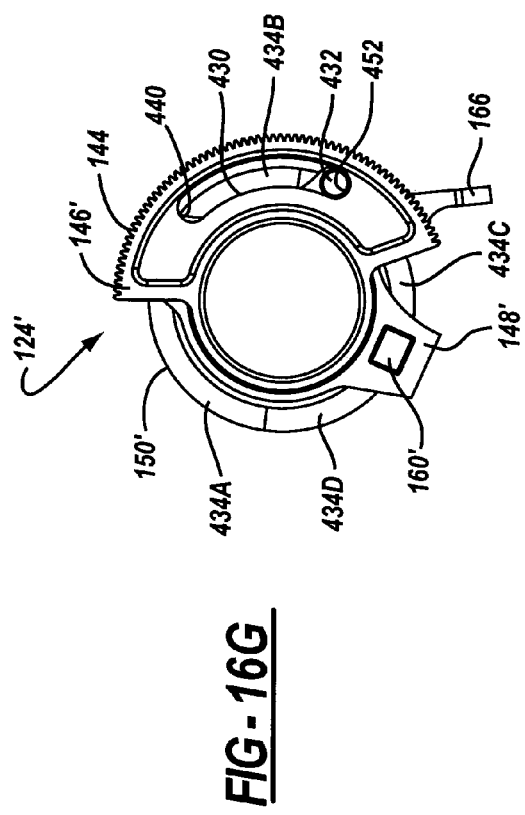

TWO-SPEED TRANSFER CASE WITH ADAPTIVE CLUTCH CONTROL

CROSS-REFERENCE TO RELATED APPLICATIONS

This application is a continuation of U.S. patent application Ser. No. 10/696,944 filed Oct. 30, 2003, now U.S. Pat. No. 6,905,436.

FIELD OF THE INVENTION

The present invention relates generally to power transfer systems for controlling the distribution of drive torque between the front and rear drivelines of a four-wheel drive vehicle. More particularly, the present invention is directed to a power transmission device for use in motor vehicle driveline applications and having a power-operated clutch actuator that is operable for controlling actuation of a multi-plate friction clutch assembly.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation. For example, the torque transfer mechanism can include a dog-type lock-up clutch that can be selectively engaged for rigidly coupling the secondary driveline to the primary driveline to establish a "part-time" four-wheel drive mode. In contrast, drive torque is only delivered to the primary driveline when the lock-up clutch is released for establishing a two-wheel drive mode.

A modern trend in four-wheel drive motor vehicles is to equip the power transmission device with an adaptive transfer clutch in place of the lock-up clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the multi-plate clutch assembly. In some applications, the clutch actuator may include a power-operated device that is actuated in response to electric control signals sent from an electronic controller unit (ECU). Variable control of the electric control signal is typically based on changes in current operating characteristics of the vehicle (i.e., vehicle speed, interaxle speed difference, acceleration, steering angle, etc.) as detected by various sensors. Thus, such "on-demand" power transmission devices can utilize adaptive control schemes for automatically controlling torque distribution during all types of driving and road conditions.

A large number of on-demand power transmission devices have been developed with an electrically-controlled clutch actuator that can regulate the amount of drive torque transferred to the secondary driveline as a function of the value of the electrical control signal applied thereto. In some applications, the transfer clutch employs an electromagnetic clutch as its power-operated clutch actuator. For example, U.S. Pat. No. 5,407,024 discloses an electromagnetic coil that is incrementally activated to control movement of a ball-ramp operator for applying a clutch engagement force on the multi-plate clutch assembly. Likewise, Japanese Laid-open Patent Application No. 62-18117 discloses a transfer clutch equipped with an electromagnetic actuator for directly controlling actuation of the multi-plate clutch pack assembly.

As an alternative, the transfer clutch can employ an electric motor and a drive assembly as its power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm for applying the clutch engagement force to the multi-plate clutch assembly. Moreover, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch pack.

In addition to on-demand power transmission devices, it is well known to install a center or interaxle differential between the primary and secondary drivelines to facilitate speed differentiation and torque transfer therebetween, thereby defining a "full-time" four-wheel drive mode. To minimize loss of traction due to wheel slippage, many full-time power transmission devices are now equipped with a biasing clutch for limiting slip and biasing the torque distribution ratio between the primary and secondary drivelines. Like the transfer clutch, many biasing clutches include a multi-plate clutch assembly and a power-operated clutch actuator for adaptively controlling engagement of the clutch assembly. In fact, the various power-operated clutch actuators mentioned for use in on-demand four-wheel drive systems are likewise readily adaptable for use in full-time four-wheel drive systems.

While many clutch actuation systems similar to those described above are currently used in four-wheel drive vehicles, a need still exists to advance the technology and address recognized system limitations. For example, the size and weight of the friction clutch components and the electrical power requirements of the clutch actuator needed to provide the large clutch engagement loads may make such system cost prohibitive in some four-wheel drive vehicle applications. In an effort to address these concerns, new technologies are being considered for use in power-operated clutch actuation systems.

SUMMARY OF THE INVENTION

Thus, its is an objective of the present invention to provide a power transmission device for use in a motor vehicle having a torque transfer mechanism equipped with a power-operated clutch actuator that is operable to control engagement of a multi-plate clutch assembly.

As a related objective, the torque transfer mechanism of the present invention is well-suited for use in motor vehicle driveline applications to control the transfer of drive torque between a first rotary member and a second rotary member.

According to one preferred embodiment, a transfer case is provided for use in a four-wheel drive motor vehicle having a powertrain and first and second drivelines. The transfer case includes an input shaft driven by the powertrain, a first output shaft adapted for connection to the first driveline, a second output shaft adapted for connection to the second driveline, an interaxle differential operably disposed between the input shaft and the first and second output shafts, and a torque transfer mechanism. The torque transfer mechanism includes a friction clutch assembly operably disposed between the first output shaft and the second output shaft, and a clutch actuator assembly for generating and applying a clutch engagement force to the friction clutch assembly. The clutch actuator assembly includes an electric motor, a geared reduction unit, and a clutch apply operator. The electric motor drives the geared reduction unit which, in turn, controls the direction and amount of rotation of a drive member associated with the clutch apply operator. The drive member supports rollers which ride against a ramped surface of a cam member. The contour of the ramped surface causes the cam member to move axially which results in corresponding translation of a thrust member. The thrust member transfers the thrust force generated by the cam member to disk levers which amplify the clutch engagement force exerted on the friction clutch assembly. A control system including vehicle sensors and a controller are provided to control actuation of the electric motor.

According to a related embodiment, the transfer case is further equipped with a two-speed gear reduction unit and a range clutch assembly. The gear reduction unit is operable for establishing a high-range and a low-range drive connection between the input shaft and an input member of the interaxle differential. The range clutch assembly includes a clutch sleeve that is moveable under the control of the clutch actuator assembly which is operable to coordinate actuation of the range clutch assembly and the friction clutch assembly.

According to another embodiment of the present invention, the power transmission device is an in-line coupling equipped with a torque transfer mechanism for selectively and/or automatically transferring drive torque from the first driveline to the second driveline.

According to yet another embodiment of the present invention, the torque transfer mechanism is operably associated with a power take-off unit for selectively and/or automatically transferring drive torque from the first driveline to the second driveline.

BRIEF DESCRIPTION OF THE DRAWINGS

Further objects, features and advantages of the present invention will become apparent to those skilled in the art from analysis of the following written description, the appended claims, and accompanying drawings in which:

FIGS. 16A through 16G show the components of the drive mechanism in various positions to establish different operating modes.

DETAILED DESCRIPTION OF THE PREFERRED EMBODIMENTS

The present invention is directed to a torque transfer mechanism that can be adaptively controlled for modulating the torque transferred from a first rotary member to a second rotary member. The torque transfer mechanism finds particular application in power transmission devices for use in motor vehicle drivelines such as, for example, an on-demand clutch in a transfer case or in-line torque coupling, a biasing clutch associated with a differential assembly in a transfer case or a drive axle assembly, or as a shift clutch in a multi-speed automatic transmission. Thus, while the present invention is hereinafter described in association with particular arrangements for use in specific driveline applications, it will be understood that the arrangements shown and described are merely intended to illustrate embodiments of the present invention.

Figure 1:
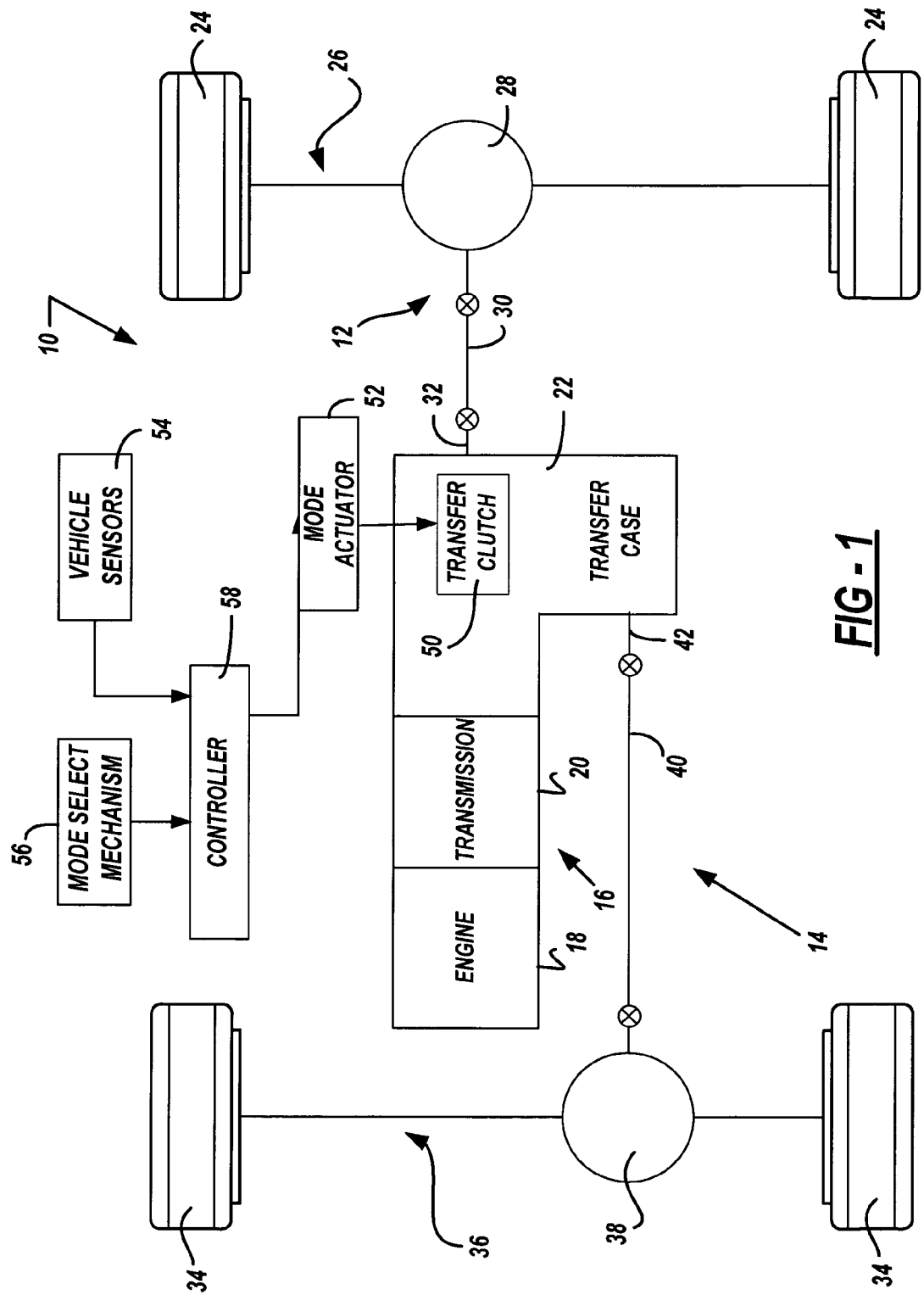
FIG. 1 illustrates the drivetrain of a four-wheel drive vehicle equipped with a power transmission device according to the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for generating and delivering rotary tractive power (i.e., drive torque) to the drivelines. In the particular non-limiting arrangement shown, primary driveline 12 is the rear driveline while secondary driveline 14 is the front driveline. Powertrain 16 includes an engine 18, a multi-speed transmission 20, and a power transmission device hereinafter referred to as transfer case 22. Rear driveline 12 includes a pair of rear wheels 24 connected at opposite ends of a rear axle assembly 26 having a rear differential 28 coupled to one end of a rear propshaft 30, the opposite end of which is coupled to a rear output shaft 32 of transfer case 22. Front driveline 14 includes a pair of front wheels 34 connected at opposite ends of a front axle assembly 36 having a front differential 38 coupled to one end of a front propshaft 40, the opposite end of which is coupled to a front output shaft 42 of transfer case 22.

With continued reference to the drawings, drivetrain 10 is shown to further include an electronically-controlled power transfer system for permitting a vehicle operator to select between a two-wheel drive mode, a locked ("part-time") four-wheel drive mode, and an adaptive ("on-demand") four-wheel drive mode. In this regard, transfer case 22 is equipped with a transfer clutch 50 that can be selectively actuated for transferring drive torque from rear output shaft 32 to front output shaft 42 so as to establish the part-time and on-demand four-wheel drive modes. The power transfer system further includes a power-operated mode actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of mode actuator 52 in response to input signals from vehicle sensors 54 and mode selector 56.

Figure 2:
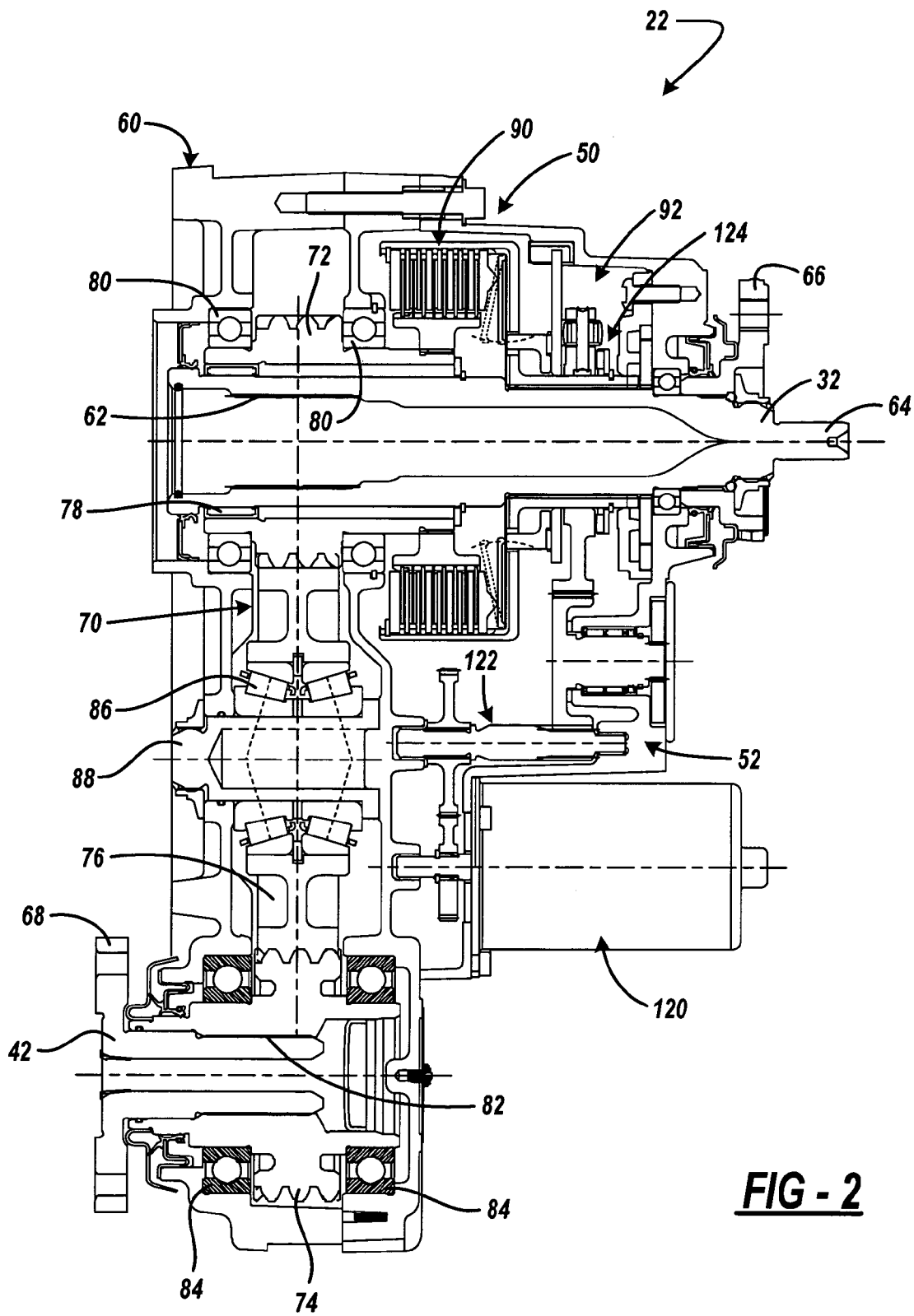
FIG. 2 is a sectional view of a transfer case associated with the drivetrain shown in FIG. 1 and which is equipped with a torque transfer mechanism according to the present invention.
Figure 3:
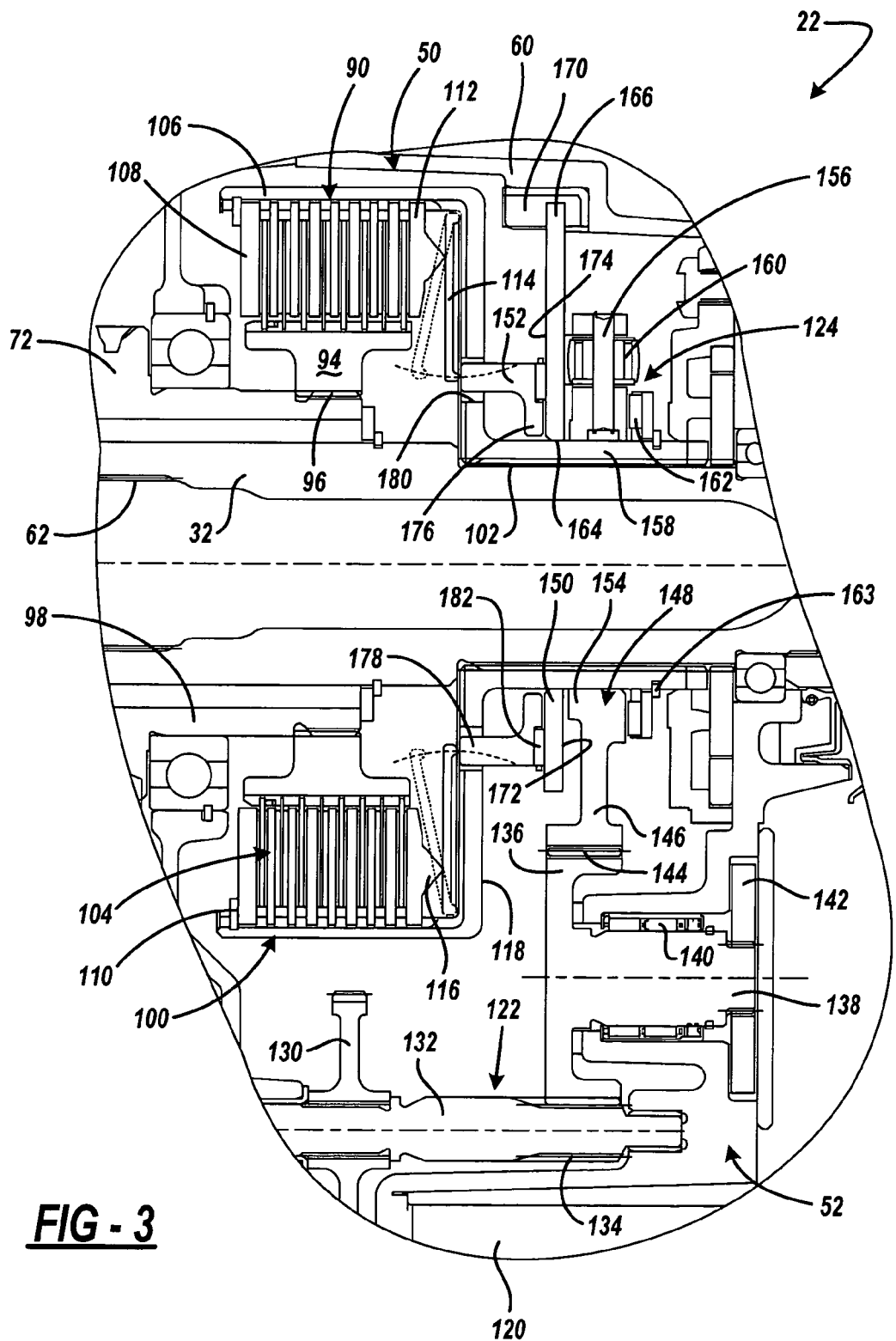
FIG. 3 is an enlarged partial view taken from FIG. 2 showing components of the torque transfer mechanism is greater detail.

Transfer case 22 is shown in FIGS. 2 and 3 to include a multi-piece housing 60 from which rear output shaft 32 is rotatably supported. Rear output shaft 32 includes an internally-splined first end segment 62 adapted for connection to the output shaft of transmission 20 and a second end segment 64 to which a yoke 66 is secured for connection to rear propshaft 30. Front output shaft 42 is likewise rotatably supported in housing 60 and includes a yoke 68 that is adapted for connection to front propshaft 40.

Transfer clutch 50 is operably arranged to transfer rotary power (i.e., drive torque) from rear output shaft 32 to front output shaft 42 through a transfer assembly 70. Transfer assembly 70 includes a first gear 72, a second gear 74, and a third gear 76 that is in meshed engagement with first gear 72 and second gear 74. First gear 72 is shown to be rotatably supported on rear output shaft 32 via a bearing assembly 78 and likewise be rotatably supported from housing 60 via a pair of laterally-spaced bearing assemblies 80. Second gear 74 is coupled via a spline connection 82 to front output shaft 42 and is rotatably supported from housing 60 by a pair of laterally-spaced bearing assemblies 84. Finally, third gear 76 is rotatably supported by bearing assemblies 86 on a stub shaft 88 that is non-rotatably secured to housing 60. It is contemplated that this geared version of transfer assembly 70 could be replaced with a well-known chain and sprocket type of transfer assembly if desired.

As will be detailed, transfer clutch 50 includes a multi-plate friction clutch assembly 90 and mode actuator 52 includes a motor-driven clutch actuator assembly 92, which together define the torque transfer mechanism of the present invention. Clutch assembly 90 is shown to include a clutch hub 94 fixed via a spline connection 96 to a tubular segment 98 of first gear 72, a clutch drum 100 fixed via a spline connection 102 to rear output shaft 32, and a multi-plate clutch pack 104 operably disposed between hub 94 and drum 100. Clutch pack 104 includes a set of outer clutch plates that are splined for rotation with and axial movement on an outer cylindrical rim segment 106 of drum 100. Clutch pack 104 also includes a set of inner clutch plates that are splined for rotation with and axial movement on clutch hub 94. Clutch assembly 90 further includes a reaction plate 108 splined for rotation with rim segment 106 of drum 100 and retained thereon via a lock ring 110, and a pressure plate 112 also splined for rotation with rim segment 106 of drum 100. Pressure plate 112 is arranged to exert a compressive clutch engagement force on clutch pack 104 in response to pivotal movement of disk levers 114. Disk levers 114 are shown to be located between an annular rim projection 116 on pressure plate 112 and a radial plate segment 118 of drum 100.

Pressure plate 112 is axially moveable relative to clutch pack 104 between a first or "released" position and a second or "locked" position. With pressure plate 112 in its released position, a minimum clutch engagement force is exerted on clutch pack 104 such that virtually no drive torque is transferred from rear output shaft 32 through clutch assembly 90 and transfer assembly 70 to front output shaft 42 so as to establish the two-wheel drive mode. In contrast, location of pressure plate 112 in its locked position causes a maximum clutch engagement force to be applied to clutch pack 104 such that front output shaft 42 is, in effect, coupled for common rotation with rear output shaft 32 so as to establish the part-time four-wheel drive mode. Therefore, accurate control of the position of pressure plate 112 between its released and locked positions permits adaptive regulation of the amount of drive torque transferred from rear output shaft 32 to front output shaft 42, thereby establishing the on-demand four-wheel drive mode.

To provide means for moving pressure plate 112 between its released and locked positions, clutch actuator assembly 92 is generally shown to include an electric motor 120, a geared reduction unit 122, and a clutch apply operator 124. Electric motor 120 is secured to housing 60 and includes a driveshaft 126. Reduction unit 122 includes three meshed gearsets each providing a ratio reduction to provide a desired cumulative reduction between motor driveshaft 126 and apply operator 124. In particular, a first gearset includes a first gear 128 driven by driveshaft 126 and which is meshed with a second gear 130 driving a transfer shaft 132. Transfer shaft 132 is shown to have its opposite ends rotatably supported in sockets formed in housing 60. The second gearset includes a third gear 134 driven by transfer shaft 132 and which is meshed with a fourth gear 136. Fourth gear 136 is shown to be integrally formed on a second transfer shaft 138 which, in turn, is rotatably supported via a bearing assembly 140 in an aperture formed in housing 60. A rotary position sensor 142 is mounted for rotation with second transfer shaft 138. The third gearset includes meshed engagement of fourth gear 136 with gear teeth 144 formed on a geared sector portion 146 of a drive member 148 associated with clutch apply operator 124. While not limited thereby, it is contemplated that reduction unit 122 provide a cumulative gear reduction in the range of 10:1 to 20:1 so as to permit use of a small low power electric motor.

Figure 4:
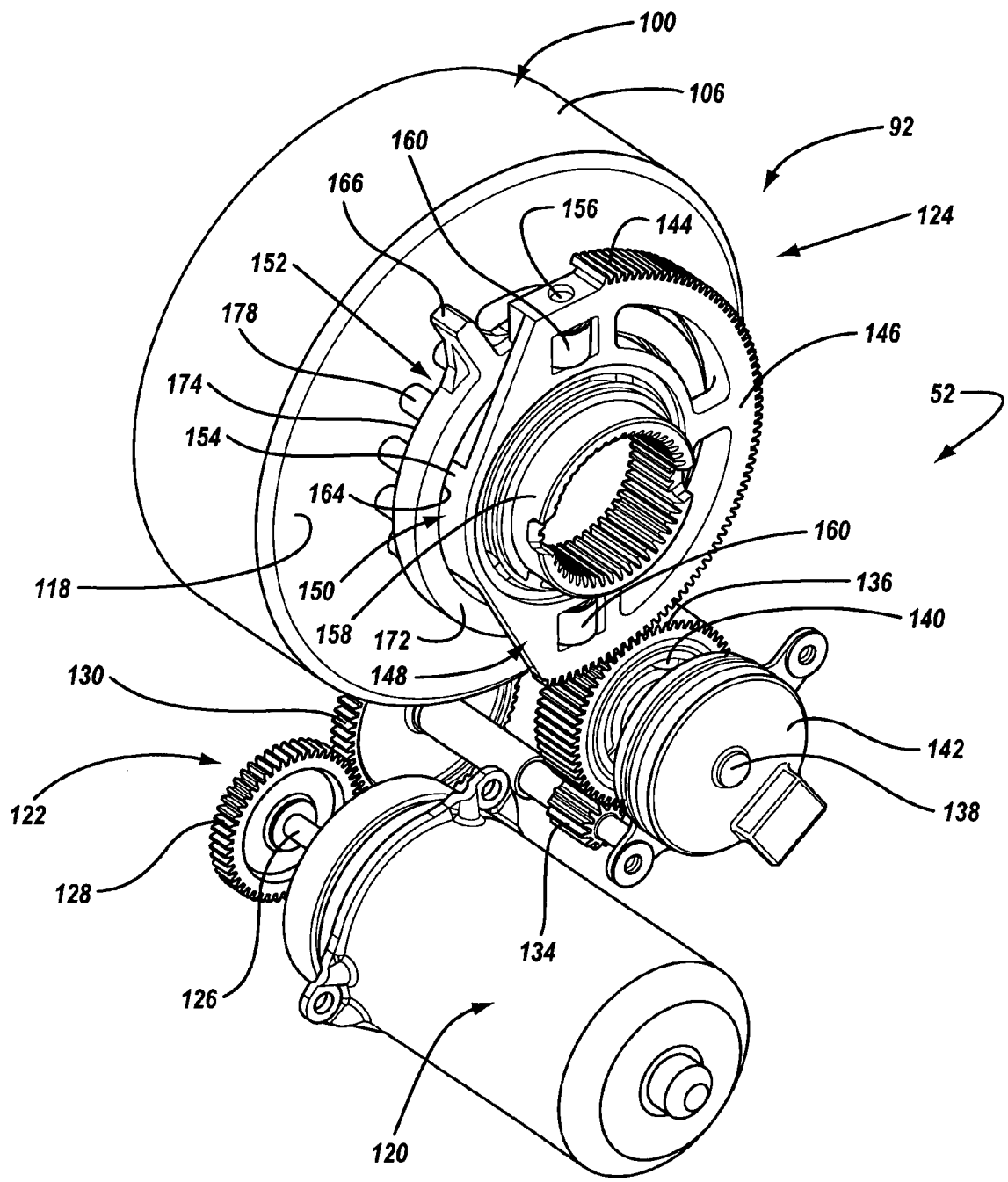
FIG. 4 is a pictorial view of components associated with the torque transfer mechanism of the present invention.

As best seen from FIGS. 3 and 4, clutch apply operator 124 includes drive member 148, a cam member 150, and a thrust member 152. Drive member 148 includes an annular hub segment 154 that is supported for angular movement on an inner sleeve segment 158 of clutch drum 100. Sector portion 146 is shown to extend from hub segment 154 and have teeth 144 extending for approximately 180°. Drive member 148 further includes a pair of diametrically opposed rollers 160 that are retained in rolling channels formed in hub segment 154. Rollers 160 are shown to be mounted for rotation about the axis of retainer pins 156 which are secured to hub segment 154. A thrust bearing assembly 162 axial locates and a snap ring 163 retains drive member 148 on inner sleeve segment 158 of drum 100.

Cam member 150 is a ring-like structure having an aperture 164 surrounding inner sleeve segment 158 of drum 100 and an outwardly extending lug projection 166. Lug 166 is retained in a slot 170 formed in housing 60 such that cam plate 150 is grounded against rotation but may move axially relative to housing 60 and drum 100. Cam plate 150 defines a first face surface 172 and a second face surface 174. First face surface 172 has a pair of tapered ramp surfaces and each roller 160 on drive member 148 is maintained in rolling contact with one of the ramp surfaces.

Thrust member 152 includes a ring segment 176 surrounding inner sleeve segment 158 of drum 100, and a plurality of circumferentially-spaced thrust pins 178 that extend axially from ring segment 176. Each thrust pin 178 has a terminal end which extends through a bore 180 formed in plate segment 118 of drum 100 and which is adapted to engage the free end of disk levers 114. A bearing assembly 182 is provided between second face surface 174 of cam plate 150 and ring segment 176 of thrust plate 152. The tapered contour of the ramp surfaces formed on first face surface 172 of cam plate 150 is selected to cause axial translation of cam plate 150 from a retracted position to an extended position in response to drive member 148 being rotated in a first direction through approximately 160° of angular travel. Such rotation of drive member 148 in the first direction is caused by electric motor 120 driving driveshaft 126 in a first rotary direction. Likewise, cam plate 150 is translated from its extended position back to its retracted position in response to drive member 148 being rotated in a second direction through the same 160° of angular travel. Such rotation of drive member 148 in the second direction is caused by electric motor 120 driving driveshaft 126 in a second rotary direction. With cam plate 150 in its retracted position, disk levers 114 act on thrust pins 178 to forcibly bias thrust member 152 against second face surface 174 so as to release disk levers 114 from engagement with pressure plate 112, thereby allowing pressure plate 112 to return to its released position. In contrast, movement of cam plate 150 to its extended position causes thrust pins 178 to forcibly pivot disk levers 114 to the position shown in phantom lines which, in turn, causes pressure plate 112 to move to its locked position.

In operation, when mode selector 56 indicates selection of the two-wheel drive mode, controller 58 signals electric motor 120 to rotate driveshaft 126 and drive member 148 in the second direction until cam plate 150 is located in its retracted position. Such action permits disk levers 114 to forcibly urge pressure plate 112 to move to its released position, thereby releasing engagement of clutch assembly 90. If mode selector 56 thereafter indicates selection of the part-time four-wheel drive mode, electric motor 120 is signaled by controller 58 to rotate driveshaft 126 and drive member 148 in the first direction for causing linear translation of cam plate 150 until it is located in its extended position. Such movement of cam plate 150 to its extended position causes corresponding movement of pressure plate 112 to its locked position, thereby coupling front output shaft 42 for common rotation with rear output shaft 32 through clutch assembly 90 and transfer assembly 70.

When mode selector 56 indicates selection of the on-demand four-wheel drive mode, controller 58 energizes motor 120 to rotate driveshaft 126 until cam plate 150 is located in a ready or "stand-by" position. This position may be its retracted position or, in the alternative, an intermediate position. In either case, a predetermined minimum amount of drive torque may be delivered to front output shaft 42 through clutch assembly 90 in this stand-by condition. This minimum amount of torque transfer is provided to take up clearances in clutch pack 104 in preparation for adaptive torque transfer. Thereafter, controller 58 determines when and how much drive torque needs to be transferred to front output shaft 42 based on current tractive conditions and/or operating characteristics of the motor vehicle, as detected by sensors 54. As will be appreciated, any control schemes known in the art can be used with the present invention for adaptively controlling actuation of transfer clutch 50 in a driveline application.

The arrangement described for mode actuator 52 is an improvement over the prior art in that the torque amplification provided by reduction gearset 122 combined with the force amplification provided by apply operator 124 and disk levers 114 permit use of a small low-power electric motor and yet provides extremely quick response and precise control over the position of cam plate 150 and thus the magnitude of the clutch engagement force applied to clutch pack 104. In this regard, clutch operator 124 is designed to provide a constant mechanical advantage so as to generate a constant torque to force conversion regardless of the rotated position of drive member 148. This feature allows clutch operator 124 to be less sensitive to component manufacturing and assembly-related clearances. In addition, fixation of rollers 160 to drive member 148 provides a positive connection so that roller 160 can be driven to any desired position in either direction without reliance on the need to "back drive" upon release. Furthermore, the approximate 160° of angular rotation of drive plate 148 improves the resolution characteristics of position sensor 142 for more precise control of the system. Finally, all forces generated are contained by drum 100, thereby permitting the clutch assembly to be packaged into several different driveline configurations without affecting the loads transferred through the main bearings.

Figure 5:
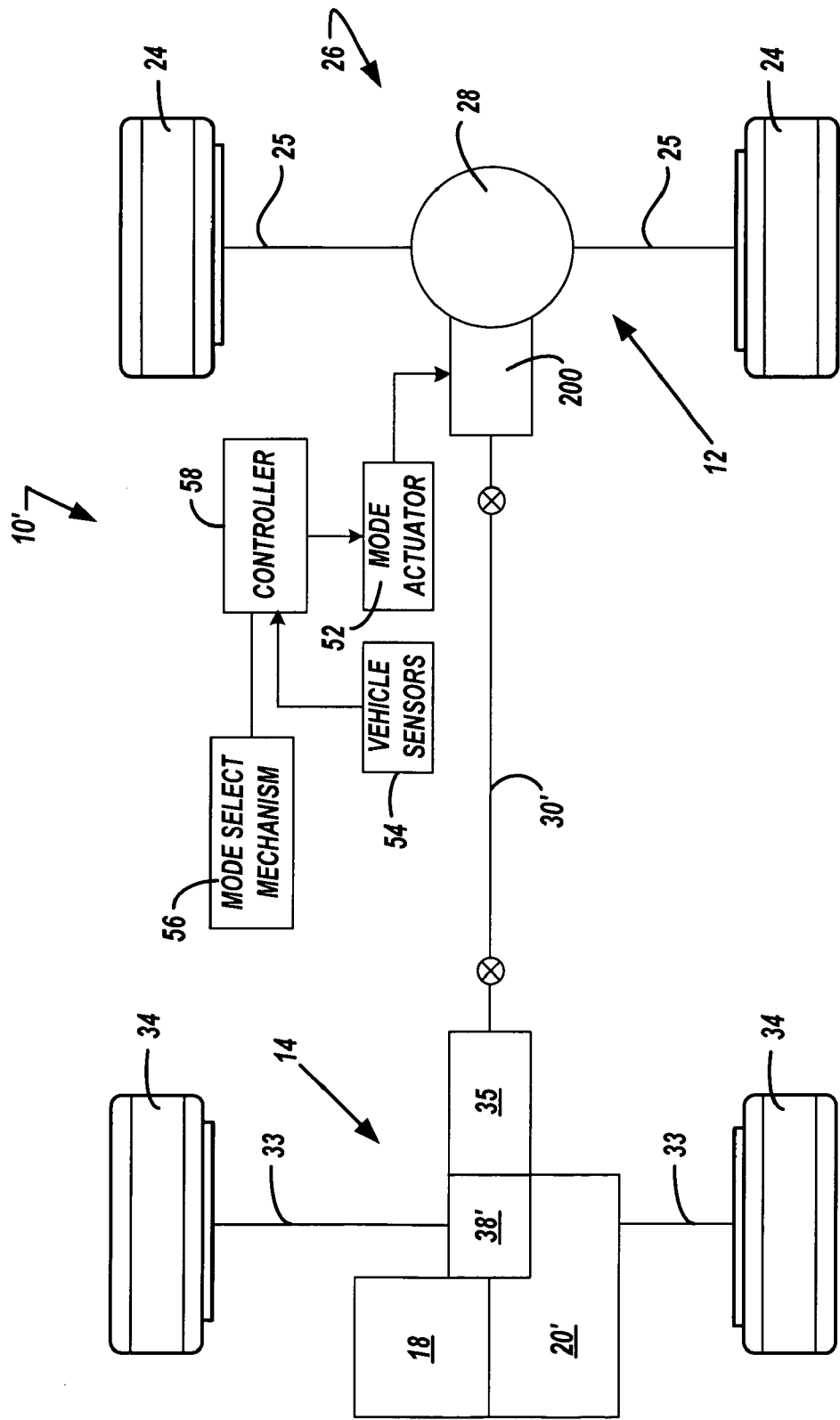
FIG. 5 is a schematic illustration of an alternative driveline for a four-wheel drive motor vehicle equipped with other power transmission devices according to the present invention.

To illustrate an alternative power transmission device to which the present invention is applicable, FIG. 5 schematically depicts a front-wheel based four-wheel drivetrain layout 10' for a motor vehicle. In particular, engine 18 drives a multi-speed transmission 20' having an integrated front differential unit 38' for driving front wheels 34 via axle shafts 33. A power transfer device, commonly referred to as power take-off unit 35, is also driven by transmission 20' for delivering drive torque to the input member of an in-line torque transfer coupling 200 via a driveshaft 30'. In particular, the input member of torque coupling 200 is coupled to driveshaft 30' while its output member is coupled to a drive component of rear differential 28 which, in turn, drives rear wheels 24 via axleshafts 25. Accordingly, when sensors indicate the occurrence of a front wheel slip condition, controller 58 adaptively controls actuation of torque coupling 200 such that drive torque is delivered "on-demand" to rear wheels 24. Thus, in this vehicular drivetrain arrangement, the front driveline is the primary driveline while the rear driveline is the secondary driveline. It is contemplated that torque transfer coupling 200 would include a multi-plate clutch assembly and a clutch actuator that are generally similar in structure and function to that of the devices previously described herein. Furthermore, while shown in association with rear differential 28, it is contemplated that torque coupling 200 could also be operably located at the front of the motor vehicle for transferring drive torque from power take-off unit 35 to drive shaft 30'.

Figure 6:
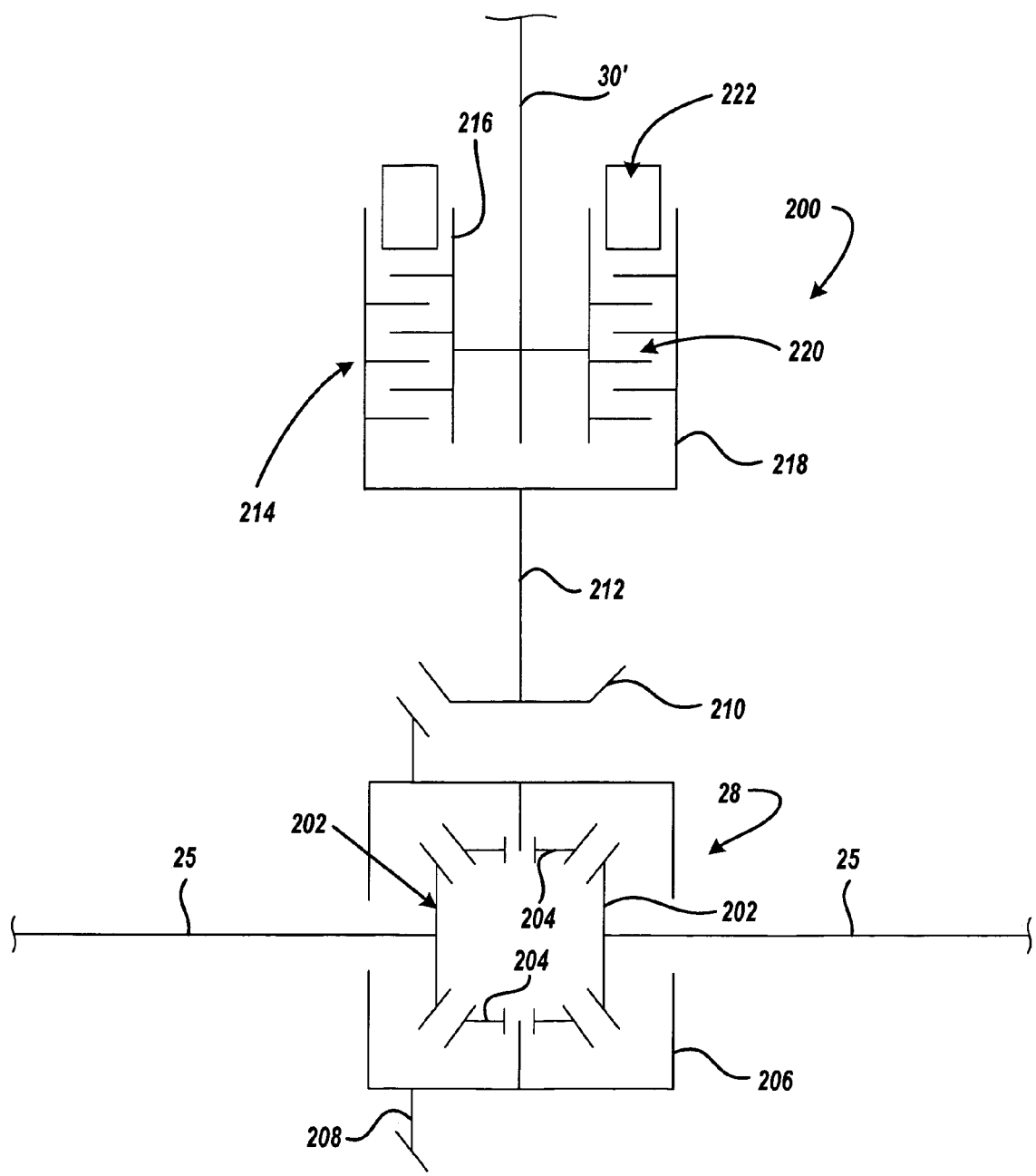
FIG. 6 through 11 are schematic view of additional embodiments of power transmission devices equipped with the torque transfer mechanisms of the present invention.

Referring to FIG. 6, torque coupling 200 is schematically illustrated operably disposed between driveshaft 30' and rear differential 28. Rear differential 28 includes a pair of side gears 202 that are connected to rear wheels 24 via rear axle shafts 25. Differential 28 also includes pinions 204 that are rotatably supported on pinion shafts fixed to a carrier 206 and which mesh with side gears 202. A right-angled drive mechanism is associated with rear differential 28 and includes a ring gear 208 that is fixed for rotation with carrier 206 and which is meshed with a pinion gear 210 that is fixed for rotation with a pinion shaft 212.

Torque coupling 200 includes a mutli-plate clutch assembly 214 operably disposed between driveshaft 30' and pinion shaft 212. Clutch assembly 214 includes a hub 216 fixed for rotation with driveshaft 30', a drum 218 fixed for rotation with pinion shaft 212, and a multi-plate clutch pack 220.

Torque coupling 200 also includes a clutch actuator assembly 222 for controlling engagement of clutch assembly 214 and thus the amount of drive torque transferred from driveshaft 30' to rear differential 28. According to the present invention, clutch actuator assembly 222 is similar in structure and function to clutch actuator assembly 92 and, as such, is only shown in schematic block form. That is, clutch actuator assembly 222 includes an electric motor driving a reduction gearset for controlling rotation of a geared drive member associated with a roller and ramp type of a clutch apply operator.

Torque coupling 200 permits operation in any of the drive modes previously disclosed. For example, if the on-demand four-wheel drive mode is selected, controller 58 regulates activation of clutch actuator 222 in response to operating conditions detected by sensors 54 by varying the electric control signal sent to the electric motor. Selection of the part-time four-wheel drive mode results in complete engagement of clutch pack 220 such that pinion shaft 212 is rigidly coupled to driveshaft 30'. Finally, in the two-wheel drive mode, clutch pack 220 is released such that pinion shaft 212 is free to rotate relative to driveshaft 30'.

Figure 7:
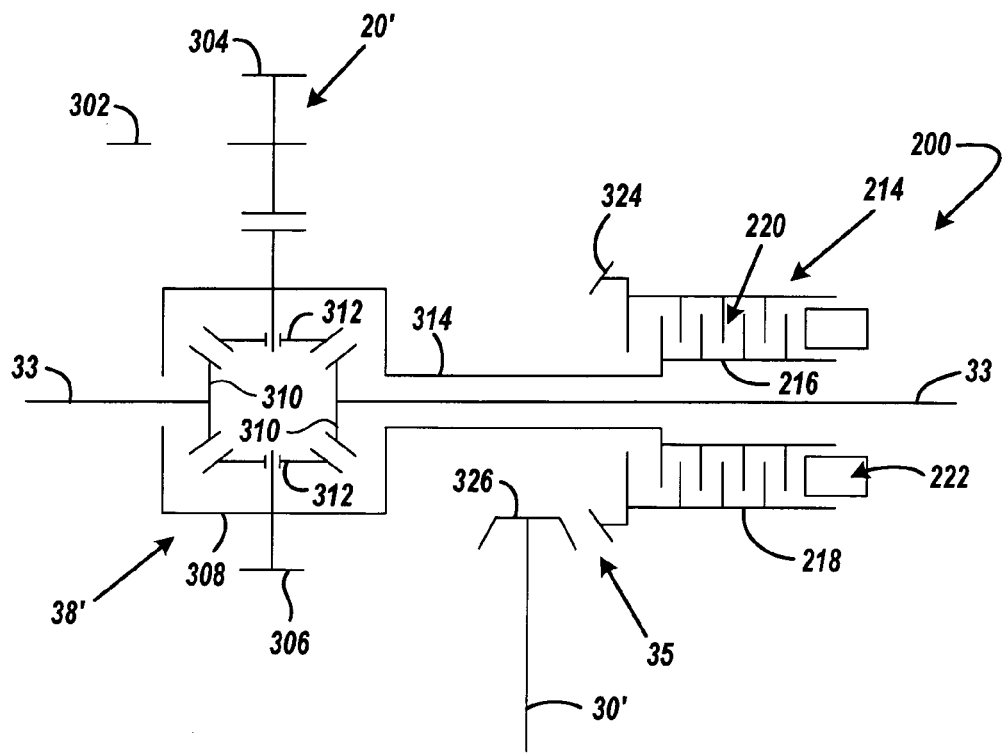

Referring now to FIG. 7, torque coupling 200 is now schematically illustrated in association with an on-demand four-wheel drive system based on a front-wheel drive vehicle similar to that shown in FIG. 5. In particular, an output shaft 302 of transaxle 20' is shown to drive an output gear 304 which, in turn, drives an input gear 306 fixed to a carrier 308 associated with front differential unit 38'. To provide drive torque to front wheels 34, front differential unit 38' includes a pair of side gears 310 that are connected to front wheels 34 via axleshafts 33. Differential unit 38' also includes pinions 312 that are rotatably supported on pinion shafts fixed to carrier 308 and which are meshed with side gears 310. A transfer shaft 314 is provided to transmit drive torque from carrier 308 to clutch hub 216 associated with multi-pate clutch assembly 214.

Transfer unit 35 is a right-angled drive mechanism including a ring gear 324 fixed for rotation with drum 218 of clutch assembly 214 and which is meshed with a pinion gear 326 fixed for rotation with driveshaft 30'. As seen, clutch actuator assembly 222 is schematically illustrated for controlling actuation of clutch assembly 212. As before, clutch actuator assembly 222 is similar to motor-driven clutch actuator assembly 92 previously described in that an electric motor is supplied with electric current for controlling translational movement of a cam plate operator which, in turn, controls engagement of clutch pack 220. In operation, drive torque is transferred from the primary (i.e., front) driveline to the secondary (i.e., rear) driveline in accordance with the particular mode selected by the vehicle operator via mode selector 56. For example, if the on-demand four-wheel drive mode is selected, controller 58 modulates actuation of clutch actuator assembly 222 in response to the vehicle operating conditions detected by sensors 54 by varying the value of the electric control signal sent to the motor. In this manner, the level of clutch engagement and the amount of drive torque that is transferred through clutch pack 220 to the rear driveline through transfer unit 35 and driveshaft 30' is adaptively controlled. Selection of a locked or part-time four-wheel drive mode results in full engagement of clutch assembly 214 for rigidly coupling the front driveline to the rear driveline. In some applications, the mode selector 56 may be eliminated such that only the on-demand four-wheel drive mode is available so as to continuously provide adaptive traction control without input from the vehicle operator.

Figure 8:
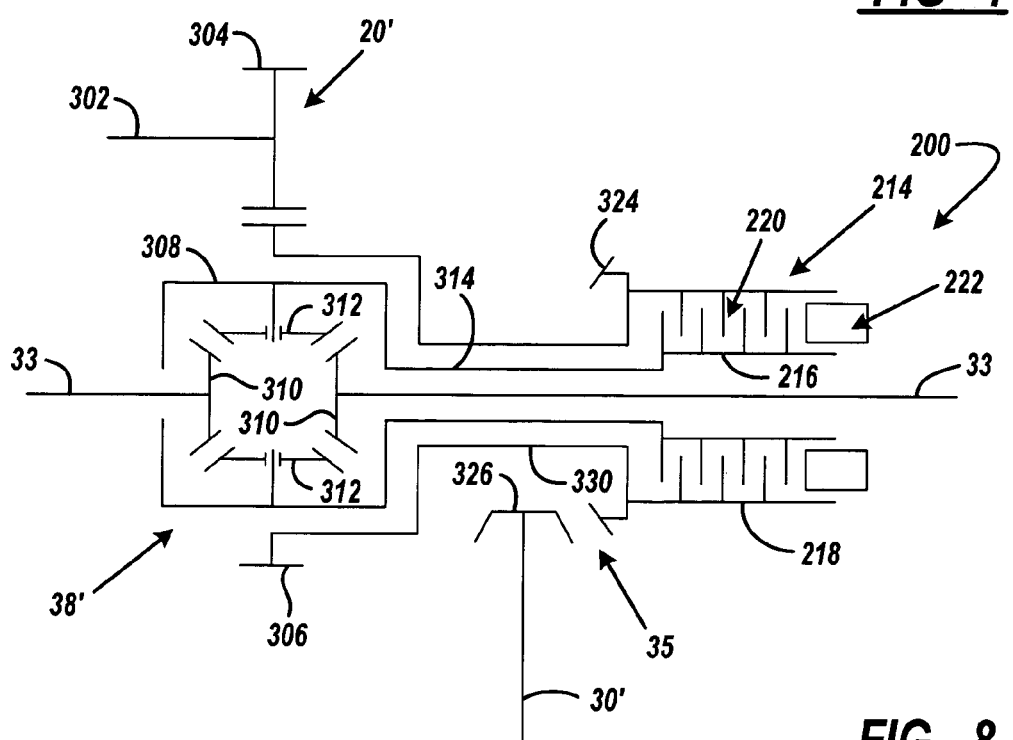

FIG. 8 illustrates a modified version of FIG. 7 wherein an on-demand four-wheel drive system is shown based on a conventional front-wheel drive motor vehicle that is uniquely arranged to normally deliver drive torque to rear wheels 24 while selectively transmitting drive torque to front wheels 34 through torque coupling 200. In this arrangement, drive torque is transmitted directly from transmission output shaft 302 to transfer unit 35 via an intermediate shaft 330 which interconnects input gear 306 to ring gear 324. To provide drive torque to front wheels 34, torque coupling 200 is shown operably disposed between intermediate shaft 330 and transfer shaft 314. In particular, clutch assembly 214 is arranged such that drum 218 is driven with ring gear 324 by intermediate shaft 330. As such, actuation of clutch actuator 222 functions to transfer torque from drum 218 through clutch pack 220 to hub 216 which, in turn, drives carrier 308 of front differential unit 38' via transfer shaft 314. Again, the vehicle could be equipped with mode selector 56 to permit selection by the vehicle operator of either the adaptively controlled on-demand four-wheel drive mode or the locked part-time four-wheel drive mode. In vehicles without mode selector 56, the on-demand four-wheel drive mode is the only drive mode available and provides continuous adaptive traction control without input from the vehicle operator.

Figure 9:
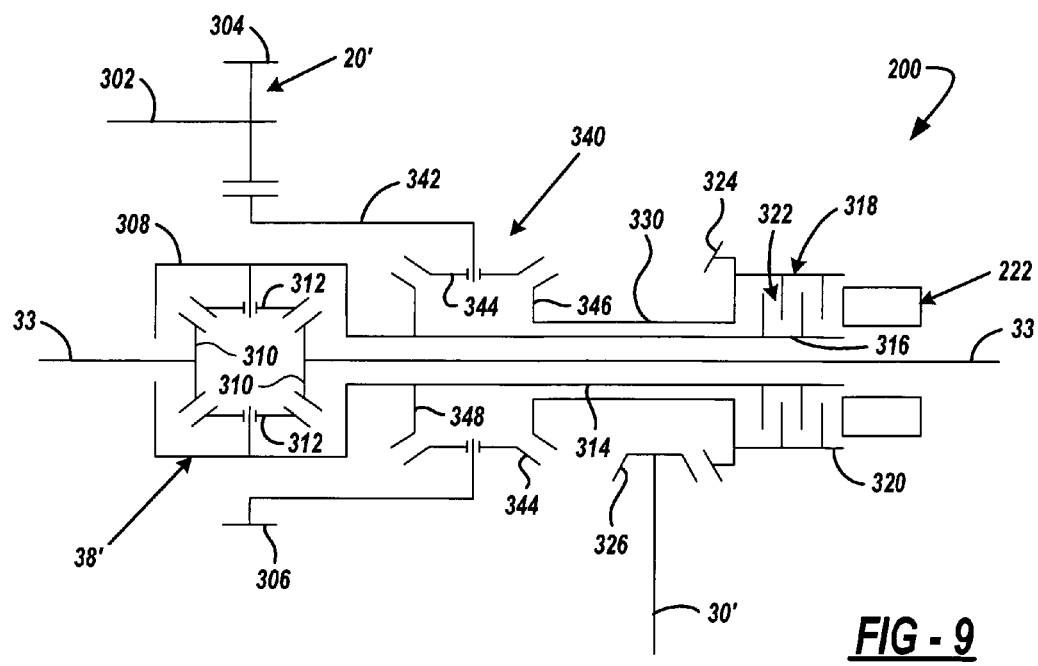

In addition to the on-demand 4WD systems shown previously, the power transmission technology of the present invention can likewise be used in full-time 4WD systems to adaptively bias the torque distribution transmitted by a center or "interaxle" differential unit to the front and rear drivelines. For example, FIG. 9 schematically illustrates a full-time four-wheel drive system which is generally similar to the on-demand four-wheel drive system shown in FIG. 8 with the exception that an interaxle differential unit 340 is now operably installed between carrier 308 of front differential unit 38' and transfer shaft 314. In particular, output gear 306 is fixed for rotation with a carrier 342 of interaxle differential 340 from which pinion gears 344 are rotatably supported. A first side gear 346 is meshed with pinion gears 344 and is fixed for rotation with intermediate shaft 330 so as to be drivingly interconnected to the rear driveline through transfer unit 35. Likewise, a second side gear 348 is meshed with pinion gears 344 and is fixed for rotation with carrier 308 of front differential unit 38' so as to be drivingly interconnected to the front driveline. Torque transfer mechanism 200 is now shown to be operably disposed between side gears 346 and 348. As such, torque transfer mechanism 200 is operably arranged between the driven outputs of interaxle differential 340 for providing a torque biasing and slip limiting function.

Torque transfer mechanism 200 is shown to again include multi-plate clutch assembly 214 and clutch actuator assembly 222. Clutch assembly 214 is operably arranged between transfer shaft 314 and intermediate shaft 330. In operation, when sensor 54 detects a vehicle operating condition, such as excessive interaxle slip, controller 58 adaptively controls activation of the electric motor associated with clutch actuator assembly 222 for controlling engagement of clutch assembly 318 and thus the torque biasing between the front and rear driveline. If the vehicle is equipped with mode selector 56, the vehicle operator would be allowed to select either of an adaptive full-time 4WD mode or a locked 4WD mode. In the adaptive full-time 4WD mode, the torque biasing ratio between front and rear drivelines can be modulated based on the operating characteristics and/or road conditions in a manner similar to that previously discussed for the on-demand 4WD mode. When the locked 4WD mode is selected, interaxle differential 340 is effectively locked such that transfer shaft 314 and intermediate shaft 330 are commonly driven. In vehicles without mode selector 56, the adaptive full-time 4WD mode would be the only drive mode available and provide continuous adaptive traction control without any input from the vehicle operator.

Figure 10:
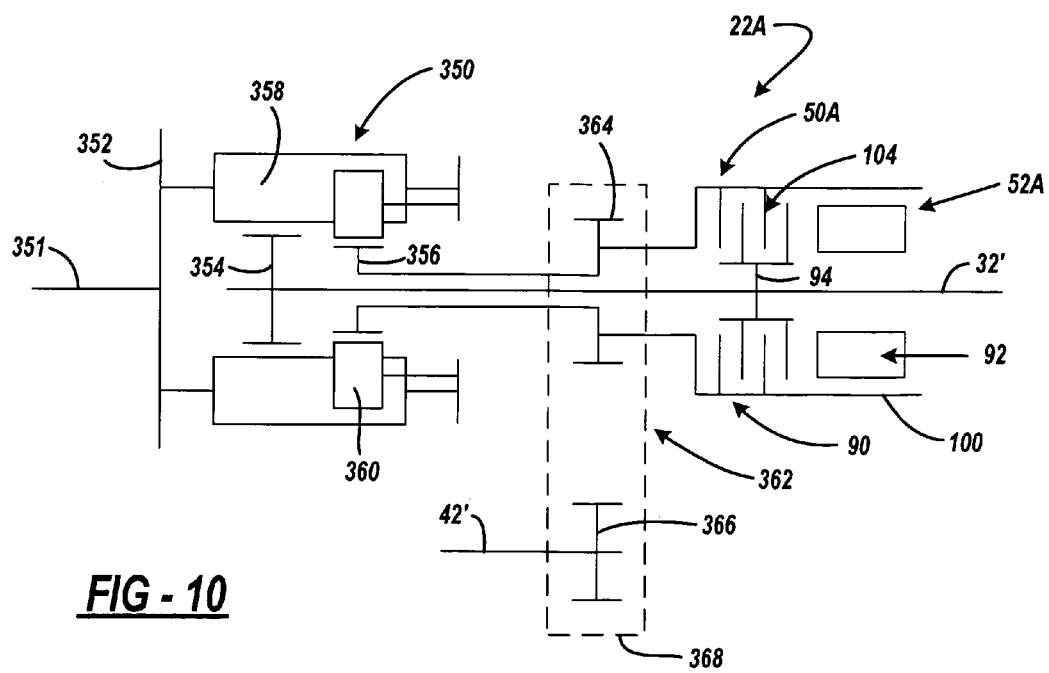

Referring now to FIG. 10, an alternative full-time 4WD system is shown to include a transfer case 22A that is equipped with an interaxle differential 350 between an input shaft 351 driven by the output shaft of transmission 20 and output shafts 32' and 42'. Differential 350 includes an input member defined as a planet carrier 352, a first output member defined as a first sun gear 354, a second output member defined as a second sun gear 356, and a reaction gearset for permitting speed differentiation between first and second sun gears 354 and 356. The reaction gearset includes meshed pairs of first planet gears 358 and second planet gears 360 which are rotatably supported by planet carrier 352. First planet gears 358 are shown to mesh with first sun gear 354 while second planet gears 350 are meshed with second sun gear 356. First sun gear 354 is fixed for rotation with rear output shaft 32' so as to transmit drive torque to rear driveline 12. To transmit drive torque to front driveline 14, second sun gear 356 is coupled to a transfer assembly 362 which includes a first sprocket 364 rotatably supported on rear output shaft 32', a second sprocket 366 fixed to front output shaft 42', and a power chain 368. Transfer case 22A further includes a biasing clutch 50A having a multi-plate clutch assembly 90 and a mode actuator 52A having a clutch actuator assembly 92. Again, clutch actuator assembly 92 is schematically shown but intended to be substantially similar to that disclosed in association with transfer case 22 of FIGS. 2 and 3.

Figure 11:
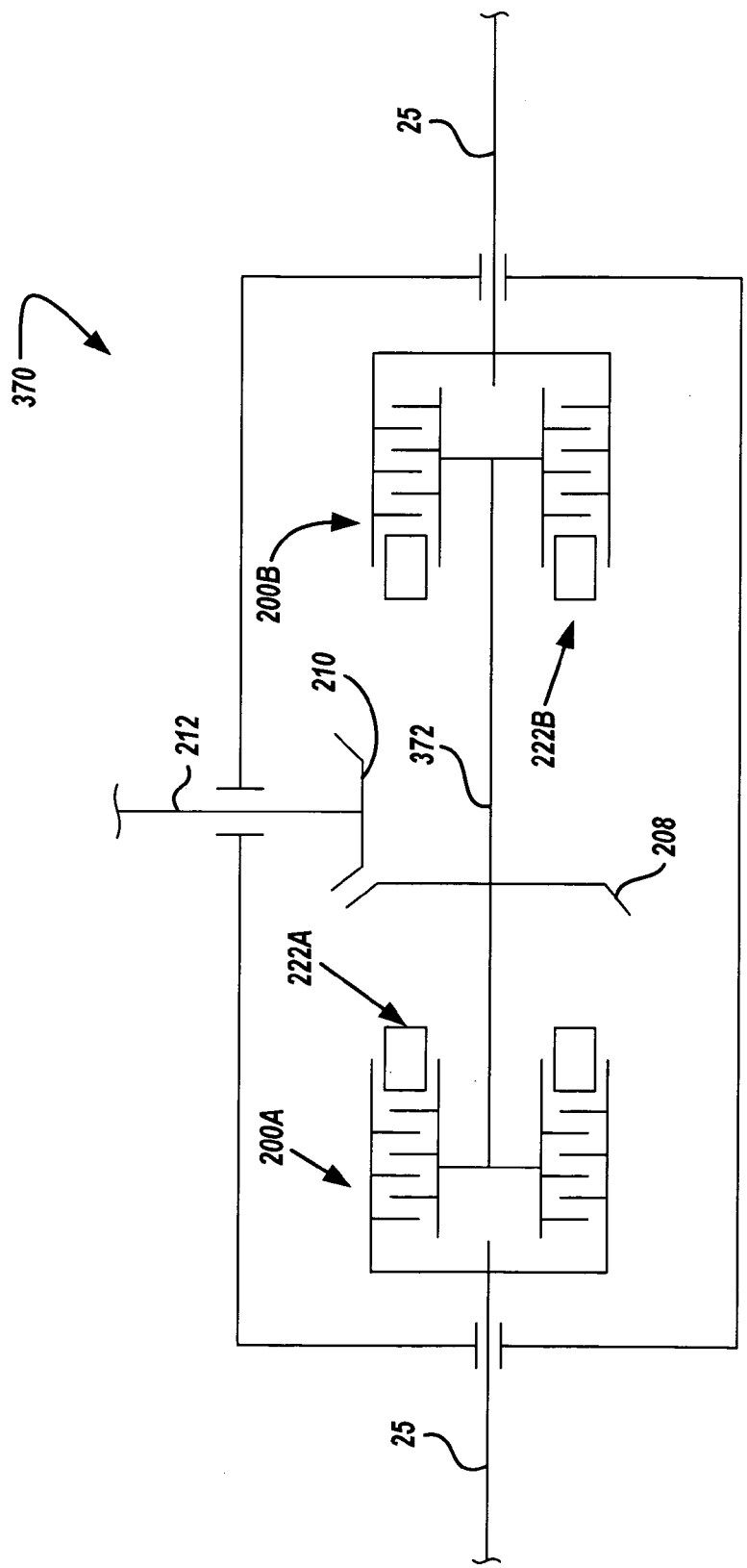

Referring now to FIG. 11, a drive axle assembly 370 is schematically shown to include a pair of torque couplings operably installed between driven pinion shaft 212 and rear axle shafts 25. Pinion shaft 212 drives a right-angle gearset including pinion 210 and ring gear 208 which, in turn, drives a transfer shaft 372. A first torque coupling 200A is shown disposed between transfer shaft 372 and one of axle shaft 25 while a second torque coupling 200B is disposed between transfer shaft 372 and the other of axle shafts 25. Each of the torque couplings can be independently controlled via activation of its corresponding clutch actuator assembly 222A, 222B to adaptively control side-to-side torque delivery. In a preferred application, axle assembly 370 can be used in association with the secondary driveline in four-wheel drive motor vehicles.

Figure 12:
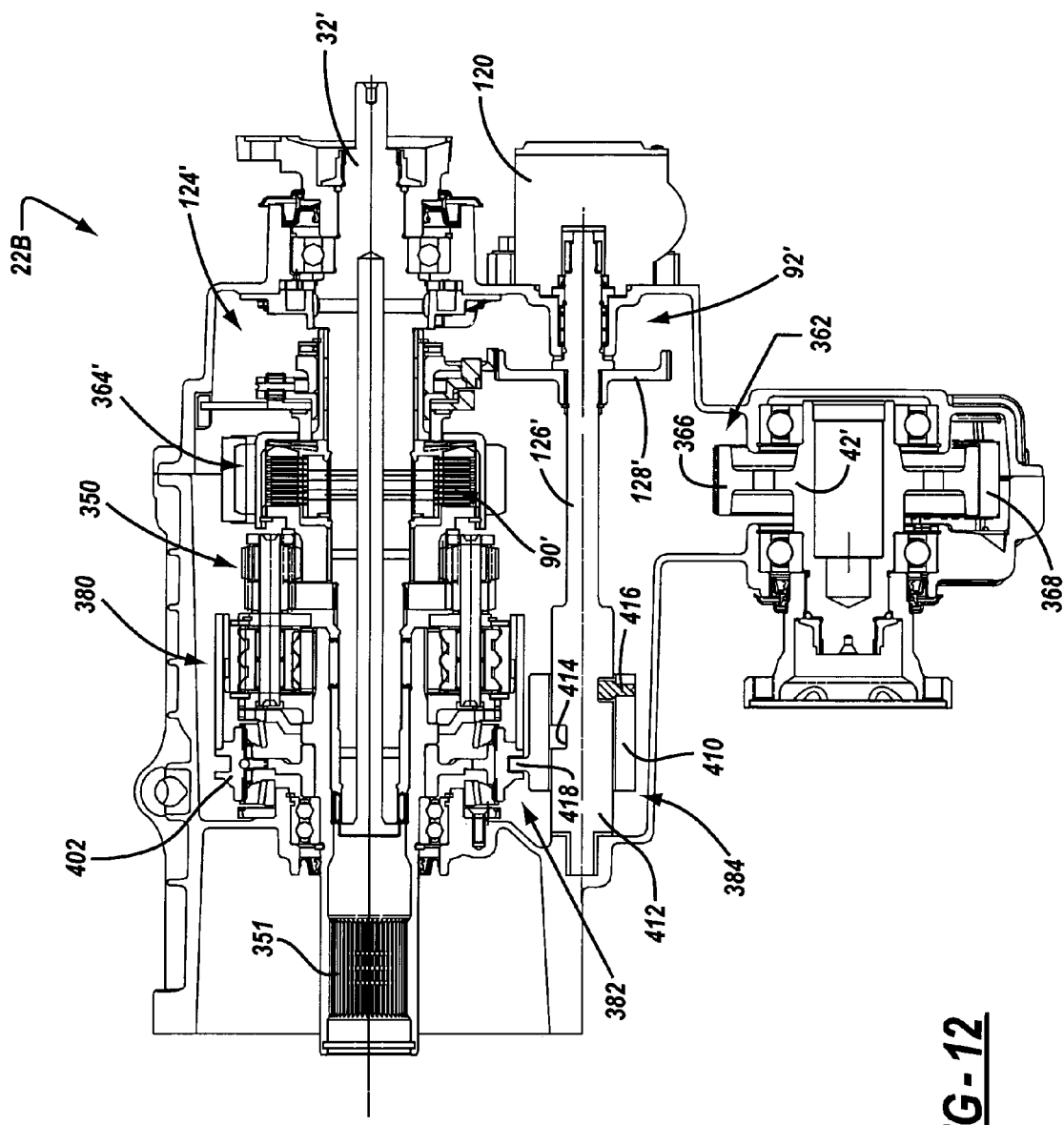
FIG. 12 is a sectional view of a two-speed full-time transfer case equipped with a range clutch assembly and a torque transfer mechanism according to the present invention.
Figure 13:
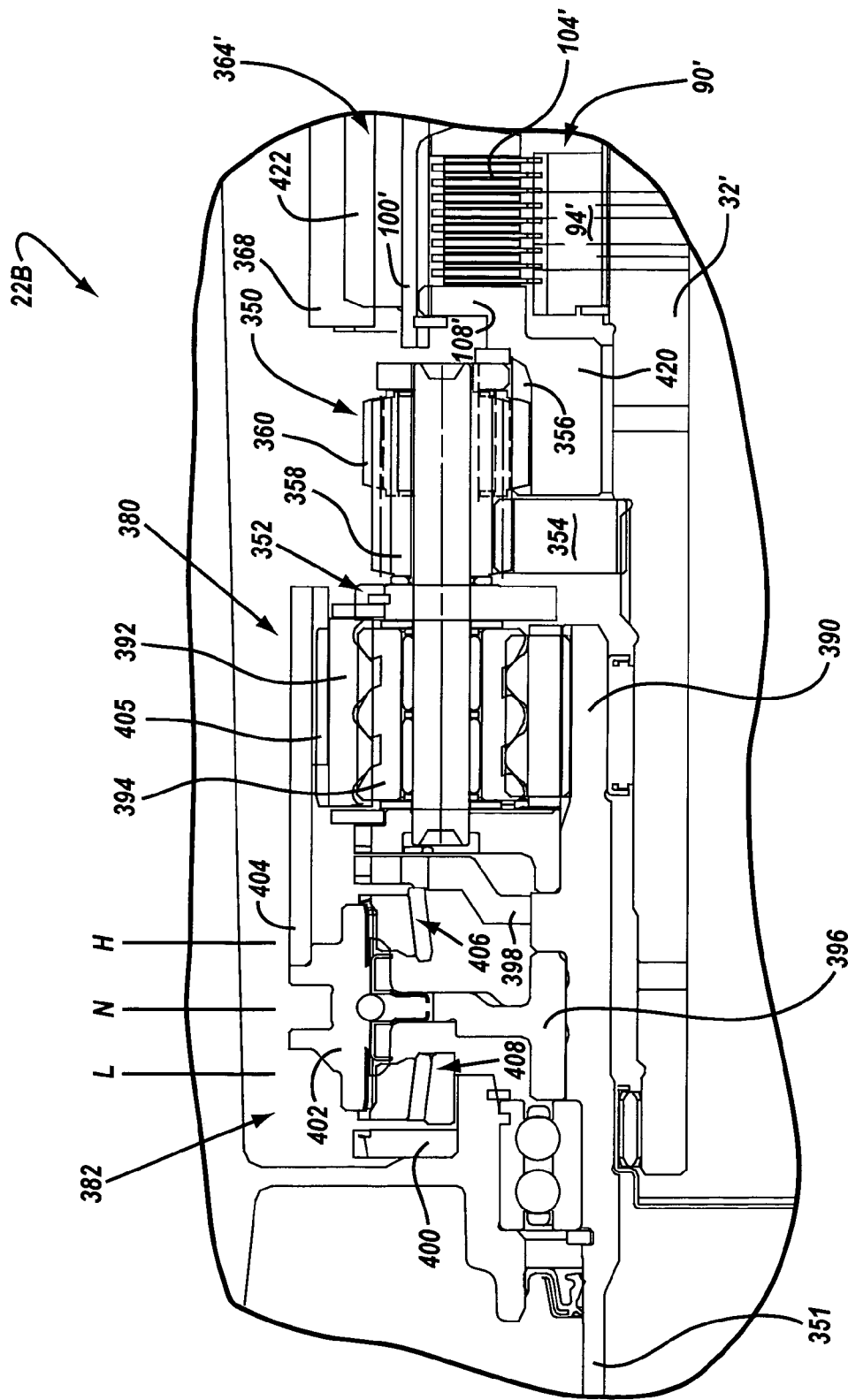
FIG. 13 is an enlarged partial view taken from FIG. 12 showing components of the range clutch assembly and interaxle differential assembly in greater detail.
Figure 14:
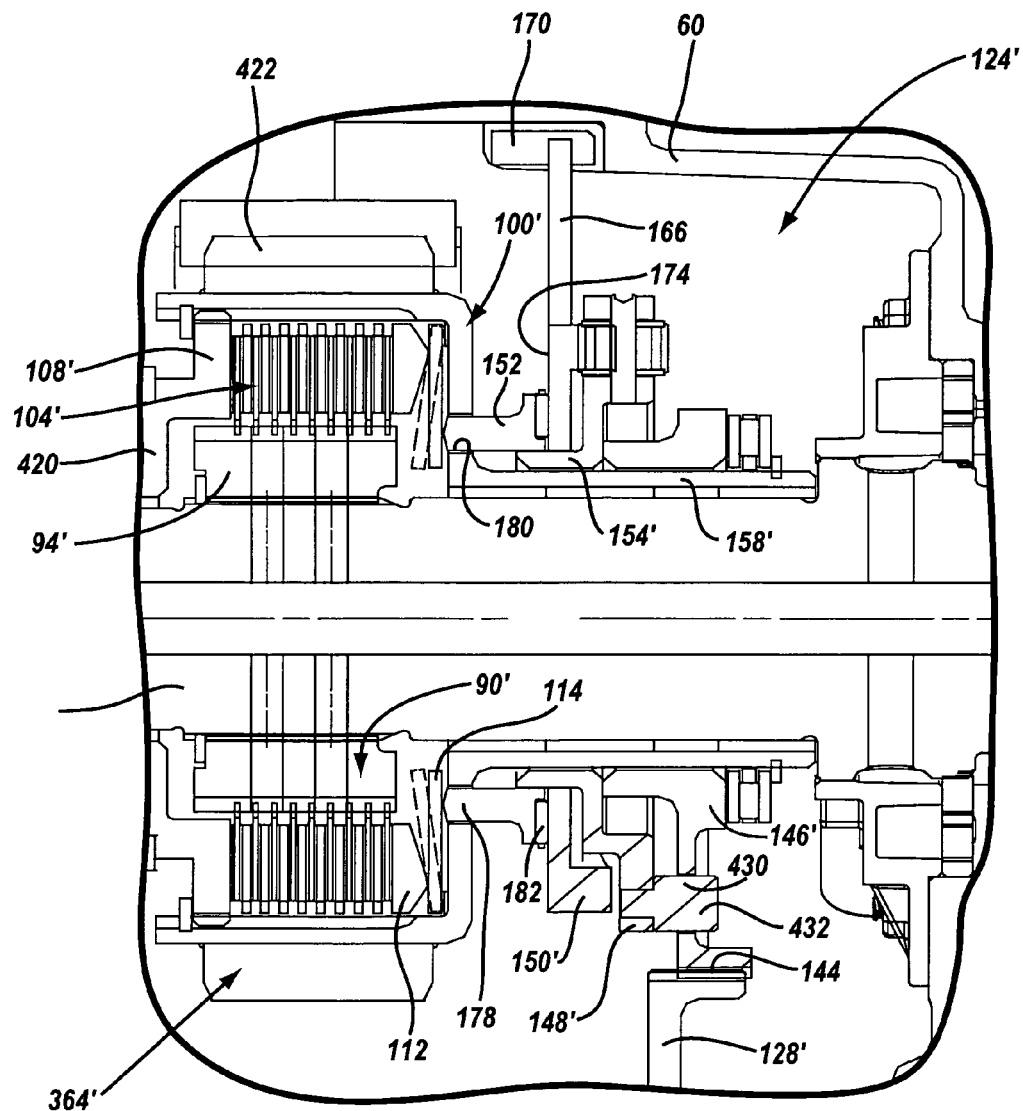
FIG. 14 is also an enlarged partial view of FIG. 12 showing components associated with the torque transfer mechanism.
Figure 15:
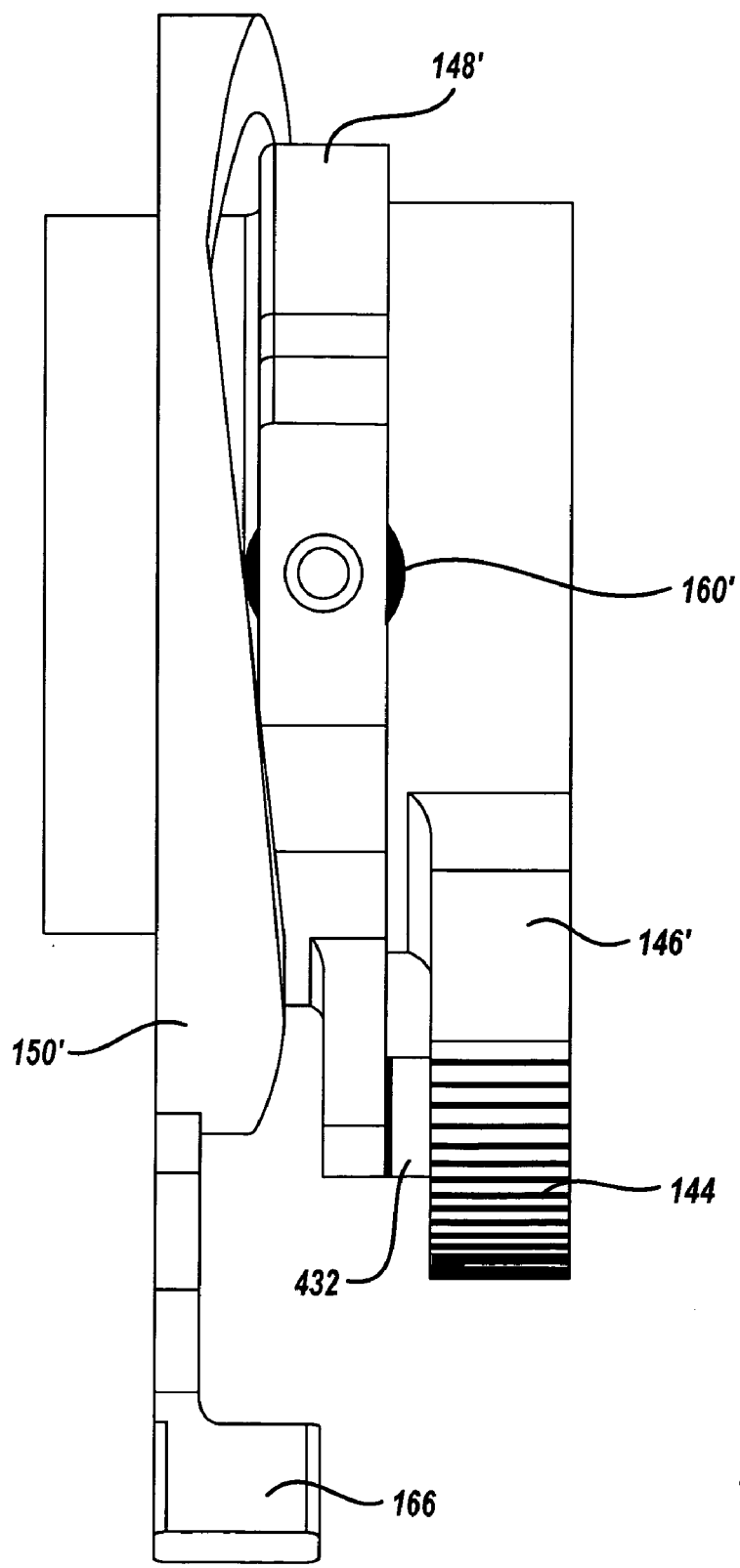
FIG. 15 is a side view of a drive mechanism associated with the clutch actuator assembly for the torque transfer mechanism shown in FIGS. 12 and 13.

Referring now to FIG. 12, a transfer case 22B is shown which includes a gear reduction unit 380, a range clutch assembly 382 and a range shift mechanism 384 that permit "on-the-move" shifting between high-range and low-range drive modes. As will be detailed, gear reduction unit 380 is operably located between input shaft 351 and planet carrier 352 of interaxle differential 350 such that transfer case 22B is considered to be a modified version of transfer case 22A shown schematically in FIG. 10. As such, common reference numerals are used to designate similar components. In essence, transfer case 22B is a two-speed version of transfer case 22A. Also, it should be understood that gear reduction unit 380 is intended to merely illustrate a preferred arrangement of components permitting deliberate selection of either of a high-range drive connection or a low-range drive connection between an input member and an output member. As such, it is contemplated that other types of gear reduction units available and/or known for use in two-speed transfer cases should be considered equivalent to the particular arrangement hereinafter detailed with specificity.

Gear reduction unit 380 includes a sun gear 390 driven by input shaft 351, a ring gear 392, and pinion gears 394 rotatably supported from carrier 352 that are meshed with both sun gear 390 and ring gear 392. In this arrangement, carrier 352 functions as both the output member of gear reduction unit 380 and the driven input member of interaxle differential 350. Range clutch assembly 382 includes a hub 396 journalled on input shaft 351, a first clutch plate 398 fixed for rotation with input shaft 351, a second clutch plate 400 non-rotationally fixed to housing 60, and a range sleeve 402 in splined engagement with hub 396. As seen, a cylindrical drum 404 is rigidly secured to range sleeve 402 and is also connected via a spline coupling 405 to ring gear 392. A pair of laterally-spaced thrust plates retained on the laterally-spaced front and rear carrier rings of planet carrier 352 are provided to axially restrain ring gear 392. Movement of range sleeve 402 from its central neutral "N" position shown to a high-range "H" position causes its internal spline teeth to engage external clutch teeth on first clutch plate 398. With range sleeve 402 in its H position, ring gear 392 is coupled for common rotation with sun gear 390, thereby locking reduction unit 380 and causing planet carrier 352 to be driven at a direct speed ratio relative to input shaft 351 for establishing the high-range drive mode. In contrast, movement of range sleeve 402 from its N position to a low-range "L" position causes its internal spline teeth to engage external clutch teeth on second clutch plate 400. With range sleeve 402 in its L position, ring gear 392 is braked against rotation, thereby causing planet carrier 352 to be driven at a reduced speed ratio relative to input shaft 351 for establishing the low-range drive mode.

Range clutch assembly 382 is further shown to include a first synchronizer 406 operably disposed between range sleeve 402 and first clutch plate 398, and a second synchronizer 408 operably disposed between range sleeve 402 and second clutch plate 400. The use of synchronizers allows range sleeve 402 to be shifted "on-the-move" without the need to stop rotation of input shaft 351, which is considered a desirable feature in some vehicle applications. However, range clutch assembly 382 is functional without the synchronizers such that transfer case 22B can be optionally constructed without such synchronizers.

Range shift mechanism 384 includes components for interconnecting range sleeve 402 to a clutch actuator assembly 92'. In particular, means are provided for moving range sleeve 402 between its three distinct range positions in response to bi-directional rotation of driveshaft 126' in response to energization of motor 120. In the particular arrangement shown, clutch actuator assembly 92' is generally similar to clutch actuator assembly 92 used with on-demand transfer case 22 (FIG. 2) and full-time transfer case 22A (FIG. 10) with the exception that geared reduction unit 122 has been eliminated and clutch apply operator 124' has been modified to separate geared sector 146' and drive member 148' into two distinct components. As such, first gear 128' is driven by driveshaft 126' and meshed with gear teeth 144 on geared sector 146' of clutch apply operator 124'. As will be detailed, means are provided for coordinating movement of range sleeve 402 with rotation of drive member 148' so as to permit establishment of a plurality of high and low-range adaptive and locked four-wheel drive modes.

Referring primarily to FIG. 12, range shift mechanism 384 is shown to include a tubular range fork 410 which surrounds a cylindrical drum 412 formed integral with, or rigidly coupled to, a distal end portion of driveshaft 126'.

Drum 412 has a helical groove 414 formed therein in which a follower pin 416 is disposed. As seen, follower pin 416 is secured to range fork 410 such that rotation of drum 412 results in linear translation of range fork 412. Range fork 412 also includes a C-shaped flange 418 which extends into a groove formed in range sleeve 402. Thus, linear translation of range fork 412 caused by rotation of drum 412 also results in corresponding translation of range sleeve 402, thereby facilitating movement of range sleeve 402 between its three distinct range positions in response to controlled rotation of driveshaft 126'.

First sun gear 354 of interaxle differential 380 is shown to be splined for rotation with rear output shaft 32 while second sun gear 356 is formed on a yoke 420 which is part of a sprocket assembly 364' associated with transfer assembly 362. As such, second sun gear 356 is operable to drive front output shaft 42' through transfer assembly 362. As seen, clutch assembly 90' is slightly different in structure than that shown in association with full-time transfer case 22A of FIG. 10 in that clutch pack 104' is now located concentrically with sprocket assembly 364' to provide improved axial packaging. However, clutch assembly 90' is still shown to have hub 94' splined for rotation with rear output shaft 32' while drum 100' is now formed to include a sprocket segment 422 thereon. Drum 100' still includes a hub segment 158' which is supported on rear output shaft 32' for rotation relative thereto. As also shown, yoke 420 includes an integral reaction plate segment 108' that is splined to drum 100', thereby coupling second sun gear 356 of interaxle differential 380 for rotation with sprocket assembly 364'.

As noted, clutch apply operator 124' has been modified to coordinate movement of range sleeve 402 with actuation of clutch assembly 90'. In this regard, geared sector 146' includes an arcuate lost-motion slot 430 into which a pin roller 432 extends that is mounted to drive member 148'. Drive member 148' still includes a hub segment 154' that is supported for angular movement on sleeve segment 158' of drum 100'. Likewise, geared sector 146' is also rotatably supported on sleeve segment 158' of drum 100'. Cam member 150' surrounds hub segment 154' of drive member 148' and now includes four ramp surfaces 434A–D formed on its first face surface 172'. In fact, the ramped surfaces define quadrants with one opposing pair 434A and 434C operable for controlling axial movement of cam plate 150' between its retracted and extended positions when range sleeve 402 is shifted into its H position. Likewise, the second opposing pair 434B and 434D of ramp surfaces control axial movement of cam plate 150' between its retracted and extended positions when range sleeve 402 is shifted into its L position.

Figure 16A:
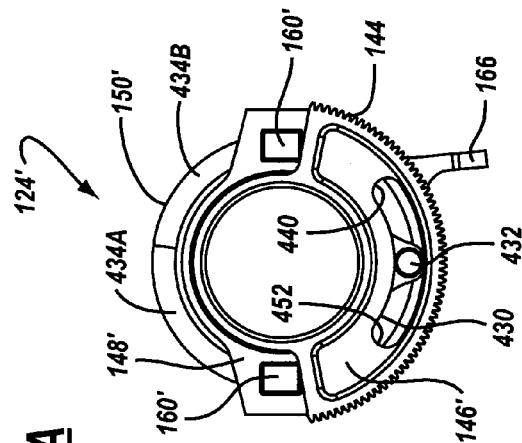

Referring to FIG. 16A, clutch apply operator 124' is shown with pin roller 432 centrally located in slot 430 and rollers 160' on drive member 148' engaging ramp surfaces 434A and 434C on cam member 150'. With clutch apply operator 124' in the position shown, range sleeve 402 is located in its central N position and cam plate 150' is located in its retracted position. As such, FIG. 16 represents the location of the various components for establishing the Neutral non-driven mode wherein no drive torque is transferred from input shaft 351 to planet carrier 352 through reduction unit 380 while clutch assembly 90' is in its released condition.

Figure 16B:
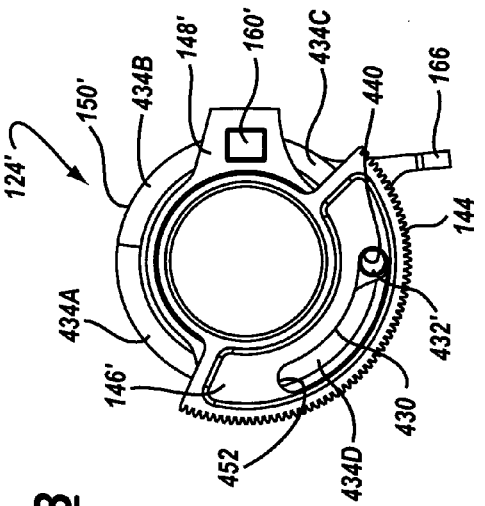

Referring now to FIG. 16B, geared sector 146' is shown rotated in a first (i.e., clockwise) direction to a position whereat pin roller 432 engages a first end surface 440 of slot 430. As seen, such rotation of geared sector 146' has not yet resulted in any rotation of drive member 148'. However, the rotation of driveshaft 126' required to rotate geared sector 146' to the position shown is sufficient to move range fork 410 for axially shifting range sleeve 402 from its central N position to its H position. As such, range sleeve 402 is coupled to first clutch plate 398 for establishing the high-range drive connection between input shaft 351 and carrier 352. Since carrier 352 acts as the input member to interaxle differential unit 350, drive torque is now delivered to the front and rear output shafts at a torque ratio defined by the specific gear geometry established by the gear components of interaxle differential 350. Furthermore, since drive member 148' has not been rotated, cam plate 150' is maintained in its retracted position such that clutch assembly 90' is likewise maintained in its released condition. As such, transfer case 22B is operable in its full-time four-wheel high-range drive mode.

Figure 16C:
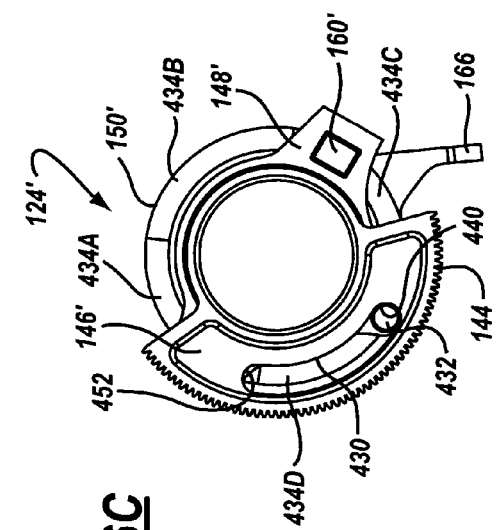

Referring now to FIG. 16C, continued rotation of geared sector 146' in the first direction has now resulted in rotation of drive member 148' due to the engagement of roller pin 432 with first end 440 of slot 430. Specifically, drive member 148' is shown rotated to a position which has caused cam plate 150' to move axially from its retracted position to its adapt-ready or stand-by position. As previously noted, locating cam plate 150' in its stand-by position causes a predetermined minimum amount of engagement of clutch assembly 90'. Such axial movement of cam plate 150' is caused by rollers 160' engaging complimentary ramped surface 434A and 434C. As will be recalled, cam plate 150' is prevented from rotating via engagement of lug 166 in housing slot 170 but is permitted to move axially between its retracted and extended positions due to engagement of rollers 160' against the ramp surfaces. In addition, the profile of groove 414 in range fork 412 functions to maintain range sleeve 402 in its H position during the continued rotation of driveshaft 126' required to rotate geared sector 146' to the position shown in FIG. 16C.

Figure 16D:
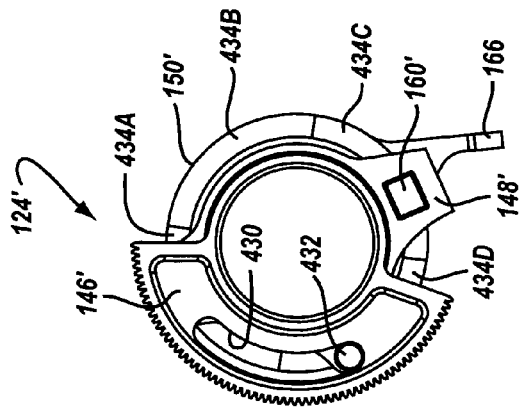

Referring now to FIG. 16D, continued rotation of geared sector 146' in the first direction has now caused drive member 148' to be rotated to a position which results in axial movement of cam plate 150' to its extended position, thereby causing pressure plate 112 to move to its locked position for fully engaging clutch assembly 90'. As such, transfer case 22B is operating in its locked four-wheel high-range drive mode. The cam profile of ramp surfaces 434A and 434C defines the range of axial movement of cam plate 150' from its retracted position to its extended position due to rotation of drive member 148' in the first rotary direction from the position shown in FIG. 16B to the position shown in and FIG. 16D. As should be obvious, rotation of drive member 148' in the opposite second rotary direction from the position shown in FIG. 16D will result in cam plate 150' moving from its extended position back toward its retracted position. In particular, the biasing force exerted by disk levers 114 on thrust pins 178 forcibly bias thrust member 152 against second face surface 174 of cam plate 150', thereby causing cam plate 150' to be biased toward its retracted position. This action forces rollers 160' to ride along cam surfaces 434A and 434C and rotate drive member 148' while maintaining engagement of pin 432 against end 440 of slot 430.

As described, FIGS. 16A and 16B illustrate the movement of the components associated with clutch apply operator 124' required to accommodate shifting of range clutch assembly 382 from its Neutral non-driven mode into its full-time four-wheel high-range drive mode. In particular, geared sector 146' is rotated through a "dwell" range of angular movement to accommodate axial movement of range sleeve 402 between its N and H positions without effecting movement of the components required to actuate clutch assembly 90'. Likewise, FIGS. 16C and 16D illustrate the movement of the components of clutch apply operator 124' to provide adaptive control of clutch assembly 90' while range sleeve 402 is maintained in its H position. In particular, geared sector 146' is rotated through a "control" range of angular movement to cause concurrent rotation of drive member 148' which, in turn, causes axial movement of cam plate 150' between its adapt-ready and extended positions, thereby controlling the level of engagement of clutch assembly 90'.

Referring to FIGS. 16A and 16E through 16G, the sequence for shifting transfer case 22B from its Neutral mode into its four-wheel low-range drive modes is generally similar to that described above for shifting into the four-wheel high-range drive modes. Specifically, when shifting from Neutral (FIG. 16A) into a low-range mode, geared sector 146' is rotated in the second (i.e., counter clockwise) direction to a position whereat pin roller 432 engages a second end 452 of lost-motion slot 430 (FIG. 16E). Such rotation does not result in any corresponding rotation of drive member 148'. However, the rotation of driveshaft 126' required to rotate geared sector 146' to the position shown in FIG. 16E is sufficient to cause range fork 410 to axially shift range sleeve 402 from its N position to its L position, thereby coupling range sleeve 402 to second clutch plate 400 and establishing the reduced or low-range drive connection between input shaft 351 and planet carrier 352. Since clutch assembly 90' is released, planet carrier 352 delivers drive torque across interaxle differential 350 to the output shafts without any resistance to speed differentiation therebetween for establishing a full-time four-wheel low-range drive mode.

Referring to FIG. 16F, continued rotation of geared sector 146' in the second direction has now caused some rotation of drive member 148' due to the engagement of roller pin 432 with second end 452 of slot 430. Specifically, the engagement of rollers 160' with ramp surfaces 434B and 434D has caused cam plate 150' to move from its retracted position to its adapt-ready (i.e., stand-by) position. During the rotation of driveshaft 126' required to rotate geared sector 146', the profile of groove 414 in range fork 412 functions to maintain range sleeve 402 in its L position. Finally, FIG. 16G shows that continued rotation of geared sector 146' results in rotation of drive member 148' to a position causing cam plate 150' to move from its stand-by position to its fully extended position, thereby causing pressure plate 112 to move to its locked position for fully engaging clutch assembly 90' and establishing a locked four-wheel low-range drive mode.

It is contemplated that a motor vehicle equipped with transfer case 22B would also have mode selector 56 for permitting selection of the Neutral mode, an adaptive full-time four-wheel high-range drive mode, the locked four-wheel high-range drive mode, and the locked four-wheel low-range drive mode. If the Neutral mode is selected, motor 120 is energized to rotate driveshaft 126' until range sleeve 402 is located in its N position and clutch apply operator 124' is located as shown in FIG. 16A. If the adaptive full-time four-wheel high-range drive mode is subsequently selected, motor 120 would be initially activated to rotate driveshaft 126' in the first direction until range sleeve 402 is located in its H position and apply operator 124' is located in its stand-by position, as shown in FIG. 16C. Thereafter, controller 58 determines when and how much torque biasing is required based on the current tractive conditions and/or operating characteristics of the motor vehicle and controls bi-directional rotation of geared sector 146' for moving cam plate 150' between its stand-by position (FIG. 16C) and its extended position (FIG. 16D), thereby adaptively controlling actuation of clutch assembly 90'.

If the locked four-wheel high-range drive mode is selected, motor 120 is signaled to rotate driveshaft 126' in the first direction until clutch apply operator 124' is positioned as shown in FIG. 16D. Motor 120 may be required to hold this position until a subsequent drive mode is selected. A power-off brake unit could be used to hold driveshaft 126' against rotation when the locked four-wheel drive mode is established. In contrast, if the locked four-wheel low-range drive mode is selected, motor 120 rotates driveshaft 126' in the second direction until range sleeve 402 is in its L position and clutch apply operator 124' is positioned as shown in FIG. 16G so as to fully engage clutch assembly 90'. As an option, an adaptive full-time four-wheel low-range drive mode could also be offered with range sleeve 402 maintained in its L position while cam plate 150' is moved between its stand-by position (FIG. 16F) and it extended position (FIG. 16G).

Figure 17:
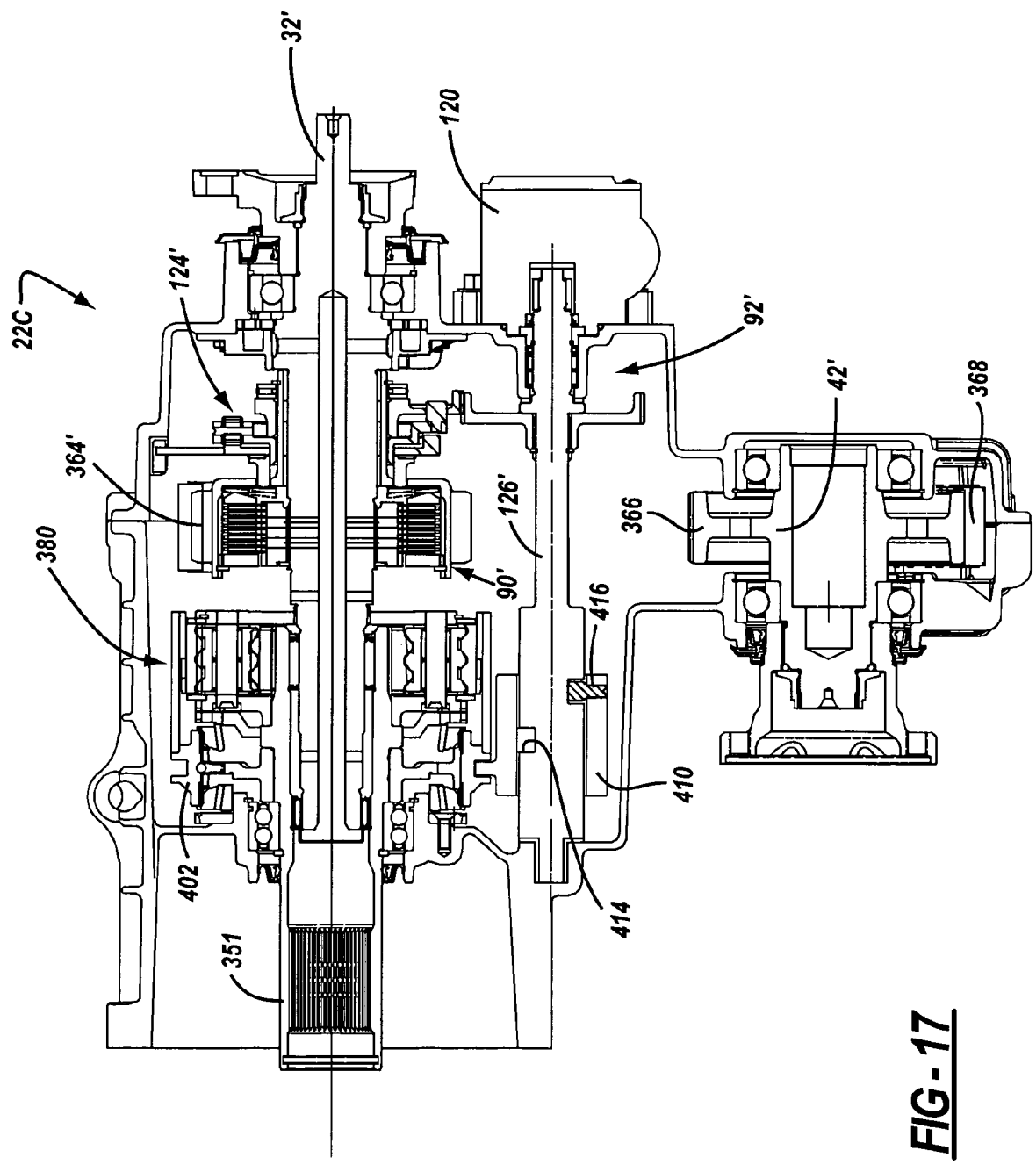
FIG. 17 is a partial sectional view of a two-speed on-demand transfer case according to another embodiment of the present invention.

FIG. 17 illustrates an on-demand version of full-time transfer case 22B of FIG. 12, hereafter referred to as transfer case 22C. Transfer case 22C is generally similar to transfer case 22B except that interaxle differential 350 has been eliminated. As such, clutch assembly 90' is the only power path for transferring drive torque from rear output shaft 32' to front output shaft 42'. As seen, carrier 352 of gear reduction unit 380 is now coupled (i.e., splined) to rear output shaft 32' for permitting establishment of either of the high-range or low-range drive connections between input shaft 351 and rear output shaft 32'. The mechanism described above for coordinating movement of range sleeve 402 and clutch apply operator 124' is again used in association with transfer case 22C. It is contemplated that mode selector 56 would permit selection of a Neutral mode, an on-demand four-wheel high-range drive mode, a part-time four-wheel high-range drive mode and a part-time four-wheel low-range drive mode. It would also be possible to permit selection of an on-demand four-wheel low-range drive mode. One skilled in the art will appreciate that the different positions shown in FIGS. 16A through 16G for clutch apply operator 124' are again applicable to establish the various drive modes mentioned above for on-demand transfer case 22C.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A transfer case for use in a motor vehicle having a powertrain and first and second drivelines, comprising:
   an input shaft driven by the powertrain;
   a reduction unit driven by said input shaft;
   a first output member adapted to drive the first driveline;
   a second output member adapted to drive the second driveline;
   a first clutch operable in a first range position for establishing a high-range drive connection between said reduction unit and said first output member and in a second range position for establishing a low-range drive connection between said reduction unit and said first output member;

a second clutch for transmitting drive torque from said first output member to said second output member;

an electric motor for rotating a driveshaft; and a clutch operator having a first member driven by said driveshaft, a second member axially moveable between first and second mode positions for controlling the magnitude of a clutch engagement force applied to said second clutch, and a third member for converting rotary movement of said first member into axial movement of said second member, said third member including a lost motion mechanism configured to permit rotary movement of said first member relative to said third member to coordinate movement of said second member between its first and second mode positions with movement of said first clutch between its first and second range positions in response to rotation of said driveshaft.

2. The transfer case of claim 1 wherein said first clutch includes a range sleeve that is axially moveable between said first and second range positions and a range shift mechanism operable to convert rotary movement of said driveshaft into axial translation of said range sleeve.

3. The transfer case of claim 2 wherein said range shift mechanism includes a cam fixed to said driveshaft, a range fork engaging said range sleeve and a follower operably disposed between said cam and said range fork.

4. The transfer case of claim 1 wherein said lost motion mechanism includes a slot formed in said first member of said clutch operator and a follower fixed to said third member which extends into said slot so as to permit relative rotation therebetween.

5. The transfer case of claim 4 wherein said first member of said clutch operator has a gear segment driven by said driveshaft, said second member of said clutch operator has a cam segment, and said third member has a drive segment engaging said cam segment.

6. The transfer case of claim 5 wherein rotation of said driveshaft in a first direction causes said first clutch to move to its first range position while said first member of said clutch operator is rotated in a first direction to cause said follower to engage a first end of said slot such that said drive segment of said third member engages a portion of said cam segment on said second member so as to locate said second member in its first mode position for applying a minimum clutch engagement force on said second clutch.

7. The transfer case of claim 6 wherein continued rotation of said driveshaft in said first direction causes said first clutch to remain in its first range position while engagement of said follower with said first end of said slot causes concurrent rotation of said third member with said first member, whereby such rotation of said third member causes its drive segment to engage said cam segment of said second member so as to move said second member from its first mode position toward its second mode position so as to increase the clutch engagement force applied to said second clutch.

8. A transfer case for use in a motor vehicle having a powertrain and first and second drivelines, comprising:
   a reduction unit driven by the powertrain;
   a first output member adapted to drive the first driveline;
   a second output member adapted to drive the second driveline;
   a range clutch operable in a first range position for establishing a high-range drive connection between said reduction unit and said first output member and in a second range position for establishing a low-range drive connection between said reduction unit and said first output member;

a friction clutch operably disposed between said first and second output members;

an electric motor for driving a driveshaft; and a clutch operator having a first member driven by said driveshaft, a second member axially moveable between first and second mode positions for releasing and engaging said friction clutch, and a third member for converting rotary movement of said first member into axial movement of said second member, said third member including a movement coordinating mechanism configured to permit relative rotation between said first and third members so as to coordinate movement of said second member between its first and second mode positions with movement of said range clutch between its first and second range positions in response to rotation of said driveshaft.

9. The transfer case of claim 8 wherein said range clutch includes a range sleeve that is axially moveable between said first and second range positions and a range shift mechanism operable to convert rotary movement of said driveshaft into axial translation of said range sleeve.

10. The transfer case of claim 8 wherein said movement coordinating mechanism includes a slot formed in one of said first and third members of said clutch operator and a follower fixed to the other of said first and third members, said follower extending into said slot so as to permit relative rotation between said first and third members.

11. The transfer case of claim 10 wherein said first member of said clutch operator has a gear segment driven by said driveshaft, said second member of said clutch operator has a cam segment, and said third member has a drive segment engaging said cam segment.

12. The transfer case of claim 11 wherein rotation of said driveshaft in a first direction causes said range clutch to move to its first range position while said first member of said clutch operator is rotated in a first direction to cause said follower to engage a first end of said slot such that said drive segment of said third member engages a portion of said cam segment on said second member so as to locate said second member in its first mode position for applying a minimum clutch engagement force to said friction clutch, and wherein continued rotation of said driveshaft in said first direction causes said first clutch to remain in its first range position while engagement of said follower with said first end of said slot causes concurrent rotation of said third member with said first member, whereby such rotation of said third member causes its drive segment to engage said cam segment of said second member so as to move said second member from its first mode position toward its second mode position so as to increase the clutch engagement force applied to said second clutch.

13. A transfer case for use in a motor vehicle having a powertrain and first and second drivelines, comprising:
   an input shaft driven by the powertrain;
   a reduction unit driven by said input shaft;
   a first output shaft adapted to drive the first driveline;
   a second output shaft adapted to drive the second driveline;
   a range clutch operable in a first range position for establishing a high-range drive connection between said first output shaft and said reduction unit and in a second range position for establishing a low-range drive connection between said first output shaft and said reduction unit;

a friction clutch for transmitting drive torque between said first output shaft and said second output shaft;

an electric motor driving a driveshaft;

a range shift mechanism for moving said range clutch between its first and second range position in response to rotation of said driveshaft;

a clutch operator adapted to generate and apply a clutch engagement force to said friction clutch, said clutch operator having a first cam member and a second cam member that is axially moveable between first and second mode positions in response to relative rotation between said first and second cam members;

a gearset having a first gear driven by said driveshaft and a second gear driven by said first gear; and a conversion mechanism for converting rotation of said gearset into axial movement of said second cam member, said conversion mechanism including a lost motion arrangement configured to permit rotation of said second gear relative to said first cam member for coordinating movement of said second cam member between its first and second mode positions with movement of said range clutch between its first and second range positions.

14. The transfer case of claim 13 wherein said lost motion arrangement includes a slot formed in said second gear and a follower fixed to said first cam member, and wherein said follower extends into said slot so as to permit limited relative rotation between said second gear of said gearset and said first cam member.

15. The transfer case of claim 14 wherein rotation of said driveshaft in a first rotary direction causes said range shift mechanism to move said range clutch to its first range position while said second gear is rotated in a first rotary direction until said follower engages a first end of said slot such that said second cam member is located in its first mode position for applying a minimum clutch engagement force to said friction clutch.

16. The transfer case of claim 15 wherein continued rotation of said driveshaft in its first rotary direction causes said range shift mechanism to maintain said range clutch in its first range position while engagement of said follower with said first end of said slot causes said first cam member to rotate relative to said second cam member thereby causing said second cam member to move toward its second mode position so as to increase the clutch engagement force applied to said friction clutch.

17. The transfer case of claim 16 wherein said second cam member includes a cam surface and said first cam member includes a cam roller engaging said cam surface.

18. A transfer case for use in a motor vehicle having a powertrain and first and second drivelines, comprising:

an input shaft driven by the powertrain;

a reduction unit having an input member driven by said input shaft and an output member;

a first output shaft adapted to drive the first driveline;

a second output shaft adapted to drive the second driveline;

an interaxle differential having an input driven by said output member of said reduction unit and first and second outputs respectively connected to said first and second output shafts;

a range clutch operable in a first range position for establishing a high-range drive connection between said input shaft and said input of said interaxle differential and in a second range position for establishing a low-range drive connection between said input shaft and said input of said interaxle differential;

a mode clutch operably disposed between said first output shaft and said second output shaft;

an electric motor for rotating a driveshaft; and a clutch operator having a first member driven by said driveshaft, a second member axially moveable between first and second mode positions for controlling the magnitude of a clutch engagement force applied to said mode clutch, and a third member for converting rotary movement of said first member into axial movement of said second member, said third member having a lost motion mechanism configured to permit limited relative rotation between said first and third members for coordinating movement of said second member between its first and second mode positions with movement of said range clutch between its first and second range positions in response to rotation of said driveshaft.

19. The transfer case of claim 18 wherein said lost motion mechanism includes a slot formed in one of said first and third members of said clutch operator and a follower fixed to the other of said first and third members which extends into said slot so as to permit relative rotation therebetween.

20. The transfer case of claim 19 wherein said first member of said clutch operator has a gear segment driven by said driveshaft, said second member of said clutch operator has a cam segment and said third member has a drive segment engaging said cam segment.

21. The transfer case of claim 20 wherein rotation of said driveshaft in a first direction causes said range clutch to move to its first range position while said first member of said clutch operator is rotated in a first direction to cause said follower to engage a first end of said slot such that said drive segment of said third member engages a portion of said cam segment on said second member so as to locate said second member in its first mode position for applying a minimum clutch engagement force on said mode clutch, and wherein continued rotation of said driveshaft in said first direction causes said range clutch to remain in its first range position while engagement of said follower with said first end of said slot causes concurrent rotation of said third member with said first member, whereby such rotation of said third member causes its drive segment to engage said cam segment of said second member so as to move said second member from its first mode position toward its second mode position so as to increase the clutch engagement force applied to said mode clutch.

* * * * *